United States Patent [19]
Felber et al.

[11] Patent Number: 5,772,254
[45] Date of Patent: Jun. 30, 1998

[54] MODULAR JOINT, WITH A REPLACEABLE SEALING SLEEVE

[75] Inventors: Kevin R. Felber, Bowie; Robert A. Barrett, Crofton; Jeffrey E. Swensen, Eldersburg, all of Md.

[73] Assignee: EG&G Pressure Science, Inc., Beltsville, Md.

[21] Appl. No.: 575,636

[22] Filed: Dec. 20, 1995

[51] Int. Cl.$^6$ .................... F16L 27/06; F16L 9/14
[52] U.S. Cl. .................... 285/16; 285/55; 285/271; 285/233
[58] Field of Search .................... 285/55, 166, 175, 285/261, 367, 16, 263, 226, 233, 271

[56] References Cited

U.S. PATENT DOCUMENTS

| | | | |
|---|---|---|---|
| 2,424,431 | 7/1947 | Booth | 285/271 |
| 3,951,418 | 4/1976 | Dryer | 285/271 |
| 4,054,306 | 10/1977 | Sadoff, Jr. et al. | 285/233 |
| 4,071,268 | 1/1978 | Halling et al. | 285/95 |
| 4,071,269 | 1/1978 | Halling et al. | 285/165 |
| 4,139,221 | 2/1979 | Shotbolt | 285/271 |
| 4,448,449 | 5/1984 | Halling et al. | 285/263 |
| 4,553,775 | 11/1985 | Halling | 285/55 |
| 4,643,463 | 2/1987 | Halling et al. | 285/226 |
| 4,779,901 | 10/1988 | Halling | 285/271 |
| 4,928,997 | 5/1990 | Reisener et al. | 285/13 |
| 4,976,287 | 12/1990 | Sheen | 285/281 |
| 5,106,129 | 4/1992 | Camacho et al. | 285/233 |
| 5,584,511 | 12/1996 | Gonzalez et al. | 285/271 |

*Primary Examiner*—Eric K. Nicholson
*Attorney, Agent, or Firm*—Roylance, Abrams, Berdo & Goodman, L.L.P.

[57] ABSTRACT

A fluid-tight modular joint is disclosed having various replaceable parts for refurbishing the joint after certain parts wear out. Specifically, the modular joint has a pair of sealing assemblies interconnected by a tubular sealing member which permits angular misalignment, axial movement and rotational movement between conduits. Each of the sealing assemblies includes a tubular housing with a replaceable sealing sleeve which is positively retained therein by a split retaining ring. Typically, the housings are welded to conduits, and thus, can only be removed by cutting them from their respective conduits. However, the housings are provided with access openings for inserting a camming tool therein to remove the sealing sleeves without cutting the housings away from their respective conduits. Therefore, in refurbishing the modular joint, the housings are reusable, while the sealing sleeves and tubular sealing members are replaceable. In one embodiment, the support member is provided with a sealing element, while in other embodiments a sealing element is provided on the housing.

37 Claims, 13 Drawing Sheets

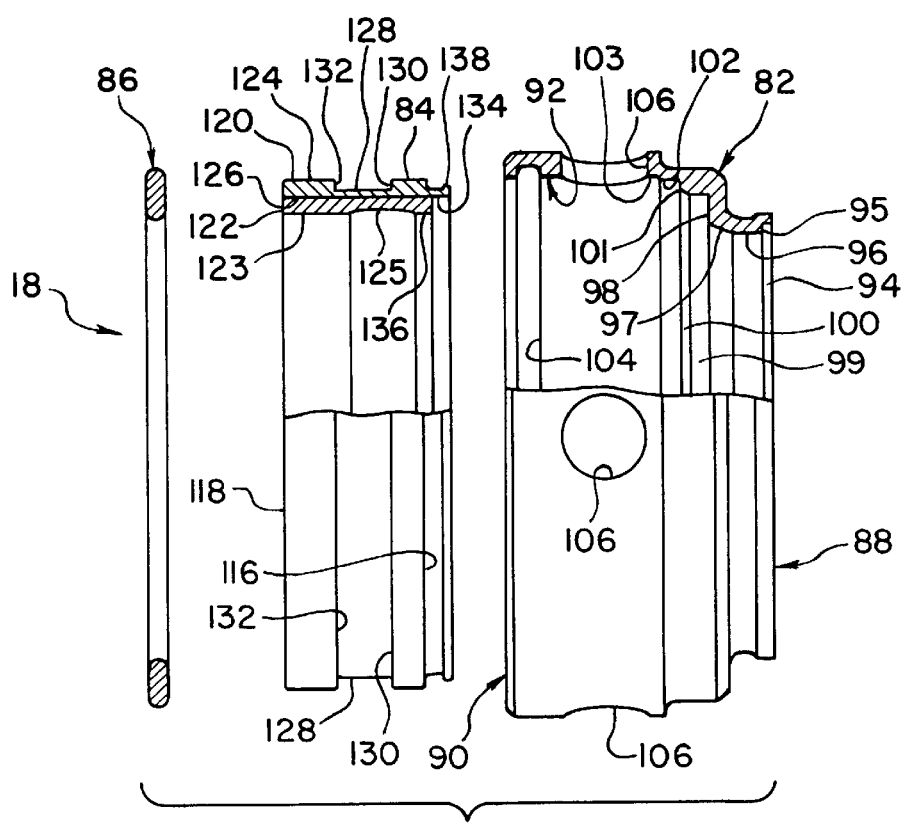
FIG. 3
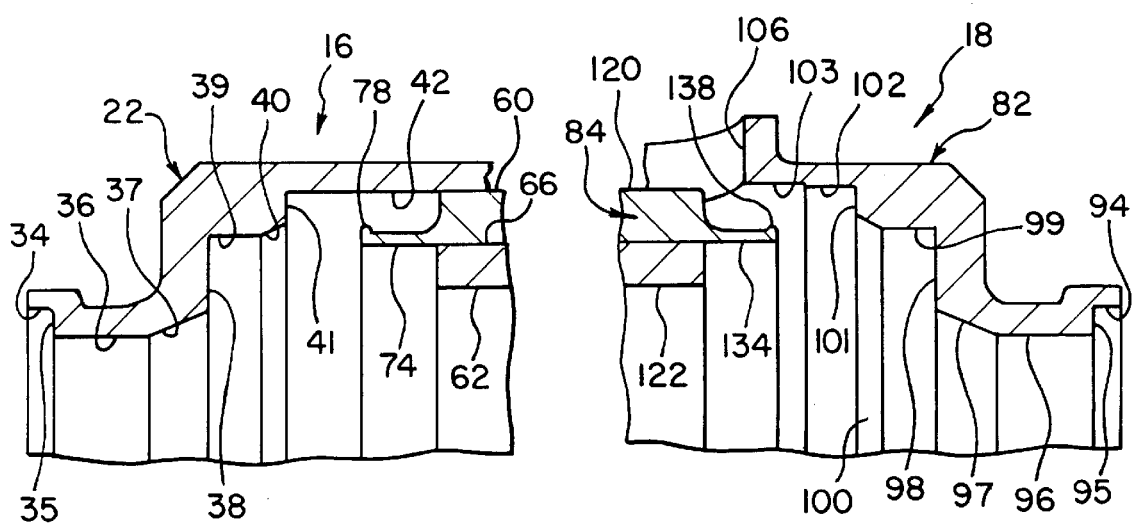
FIG. 4
FIG. 5

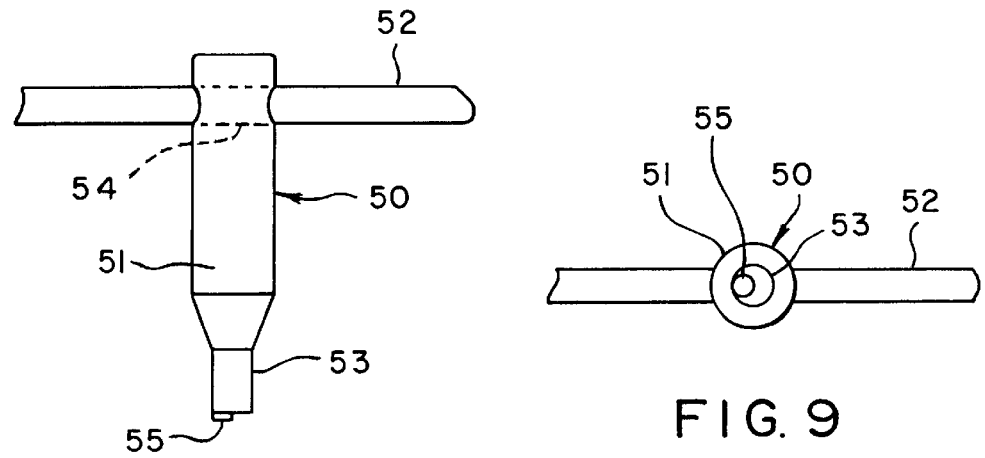
FIG. 8
FIG. 9
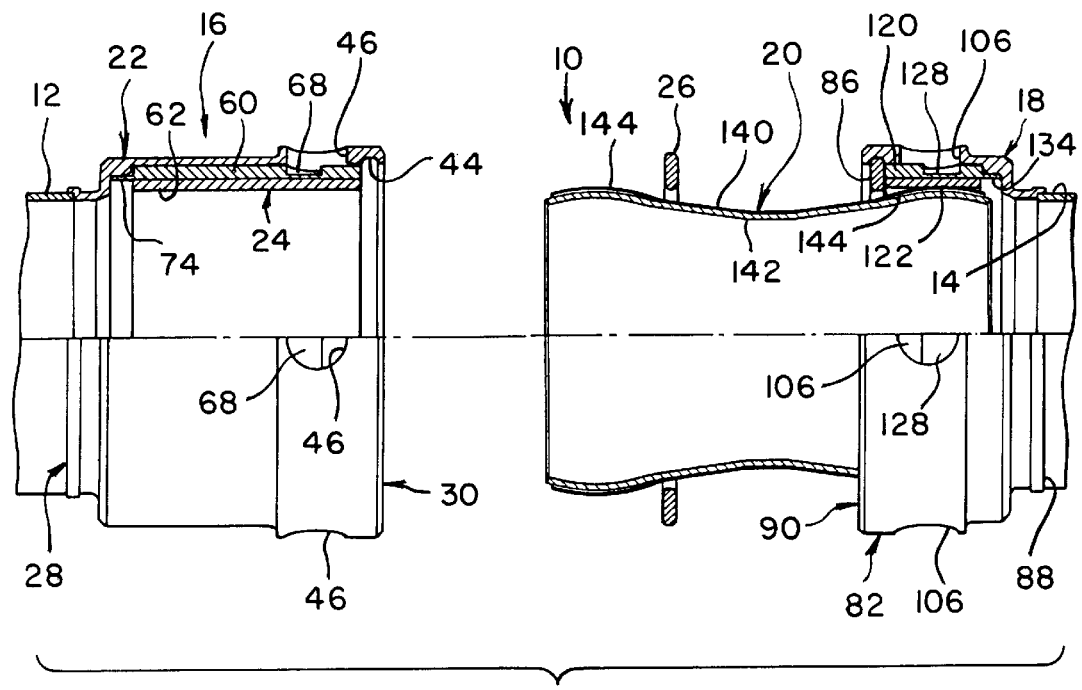
FIG. 10

5,772,254

MODULAR JOINT, WITH A REPLACEABLE SEALING SLEEVE

FIELD OF THE INVENTION

This invention generally relates to a fluid-tight modular joint for sealing and interconnecting a pair of pipes together to allow a high-pressure and temperature fluid to flow therethrough. More specifically, this invention relates to a fluid-tight modular joint which is flexible in that it permits angular misalignment, axial and rotational movement. The fluid-tight modular joint of the present invention includes replaceable parts which can be easily extracted when worn out and replaced with new ones without having to cut out the entire joint from the conduits or pipes.

BACKGROUND OF THE INVENTION

Piping systems for high-pressure and temperature fluids are generally designed to provide some degree of flexibility to allow for dimensional tolerances, thermal expansion and contraction, and vibrational deflections between various components which are connected by the piping. Lightweight compact assemblies are particularly desirable in aircraft and missile systems to provide such flexibility. Examples of such flexible prior art joints or couplings are disclosed in the following U.S. Pat. Nos. 4,054,306 to Sadoff, Jr. et al; 4,071,268 to Halling et al; 4,071,269 to Halling et al; 4,448,449 to Halling et al; and 4,553,775 to Halling.

However, these prior art couplings or joints can wear out after extended periods of time due to temperature induced movement and the high vibration occurring in the systems in which the joints are installed. Consequently, the joint will begin to leak and have to be replaced. This usually requires the entire joint or coupling to be completely removed and replaced with a new coupling.

In some instances, the joint is provided with pipe clamps for coupling and uncoupling the joint to the piping. While this provides for a convenient method of removing the joint, it results in a joint with increased weight due to the structure of the pipe clamps. In other cases, the joint is welded to the pipes. While this reduces the weight of the joint, it then requires the worker to cut the joint out of the piping system, utilizing a grinding wheel. In either case, when the seals of the joints wear out, the entire joint must be replaced. This can be quite costly.

Accordingly, it is desirable to create a joint wherein the joint can be refurbished by replacing certain parts and reutilizing other parts. In other words, it would be desirable to install joints having easily replaceable parts for the parts which wear out, while reutilizing the parts which are not subjected to as much wear. Moreover, it is desirable that this can be done relatively easily at the place of installation without having to completely remove the joint from the piping.

One example of a joint with replaceable seals is disclosed in U.S. Pat. No. 5,106,129 to Camacho et al. The Camacho et al patent discloses a flexible coupling having a tubular member with end-channels that have replaceable seals. While the coupling of the Camacho et al patent does provide for replacement of certain parts, this coupling is quite expensive. Moreover, this coupling does not provide for complete replaceability of various elements which tend to wear out.

In view of the above, it is apparent that there exists a need for a fluid-tight modular joint which is refurbishable and that is relatively inexpensive to manufacture and refurbish. Accordingly, this invention addresses these needs in the art, along with other needs which will become apparent to those skilled in the art, once given the disclosure.

SUMMARY OF THE INVENTION

One object of the present invention is to provide a fluid-tight modular joint which has refurbishable parts.

Another object of the present invention is to provide a fluid-tight modular joint which is easy to manufacture and assemble.

Another object of the present invention is to provide a fluid-tight modular joint which is relatively inexpensive to manufacture.

Another object of the present invention is to provide a replaceable sealing sleeve which is relatively inexpensive to manufacture.

Yet another object of the present invention is to provide a replaceable sealing sleeve which is easily installed into a housing of a joint and easily extracted when worn out.

Still another object of the present invention is to provide a tool which can be utilized for both installation and extraction of a replaceable sealing sleeve within a housing of a fluid-tight modular joint.

The foregoing objects are basically attained by a fluid-tight modular joint for conduits having a high pressure fluid flowing therethrough, comprising a first tubular housing having a first open end for attachment to a first conduit, a second open end for movably receiving a first end of a tubular sealing member therein, and a tubular inner surface extending between the first and second open ends; a first replaceable sealing sleeve removably secured within the tubular housing via a tool engaging an extraction portion formed thereon, the sealing sleeve having a first open end, a second open end, a tubular outer surface extending between the open ends of the sealing sleeve, and a tubular inner surface extending between the open ends of the sealing sleeve, the outer surface of the sealing sleeve being concentrically arranged and slidably received within the inner surface of the tubular housing to form an annular interface therebetween; and a first annular sealing element located at the annular interface and configured to seal and hold the sealing sleeve and the housing together.

The foregoing objects are also basically attained by a fluid-tight modular joint for conduits having a high-pressure fluid flowing therethrough comprising a tubular sealing member having a first open end with a first annular sealing surface and a second open end with a second annular sealing surface; first and second tubular housings movably coupled to the first and second open ends of the tubular sealing member, respectively, each of the first and second housings including a first open end for attachment to a conduit, a second open end for movably receiving one of the ends of the tubular sealing member therein, and an inner tubular surface extending between the first and second open ends of the first and second housings, respectively; first and second replaceable sealing sleeves removably secured within the first and second housings, respectively, via a tool engaging first and second extraction portions formed thereon, respectively, each of the first and second replaceable sealing sleeves including first and second open ends with tubular inner and outer surfaces extending therebetween, the outer surfaces of the first and second sealing sleeves engaging the inner surfaces of the first and second housings, respectively, the first and second inner surfaces movably engaging the first and second sealing surfaces of the tubular sealing member; and first and second annular sealing elements located between the first and second housings and the first and second sealing sleeves, respectively, the sealing elements being yieldably deformed to frictionally maintain the sealing sleeves coupled within the housings and to create a seal therebetween.

The foregoing objects can further be attained by a replaceable sealing sleeve for a fluid-tight modular joint, comprising a tubular support member having first and second open ends with a tubular outer surface and a tubular inner surface; and a tubular wear-resistant element rigidly coupled to the support member to overlie the inner surface of the support member, the tubular wear-resistant element having a tubular inner surface with a low coefficient of friction at elevated temperatures.

The foregoing objects are still further attained by a tool for inserting and removing a replaceable sealing sleeve within a tubular housing of a modular joint, comprising a shaft having a first end and a second end with a first longitudinal axis extending therebetween, the first end being substantially cylindrical for engaging a cylindrical bore in the tubular housing, the second end being designed for engagement with a tool to rotate the shaft about the first longitudinal axis; and a cylindrical cam member rigidly coupled to the first end of the shaft, the cam member having a second longitudinal axis parallel to and offset from the first longitudinal axis.

Other objects, advantages and salient features of the invention will become apparent to those skilled in the art from the following detailed description, which, taken in conjunction with the annexed drawings, disclosed preferred embodiments of the invention.

BRIEF DESCRIPTION OF THE DRAWINGS

Referring now to the drawings which form a part of this original disclosure:

FIG. 3 is an exploded, side elevational view in partial longitudinal section of the second sealing assembly of the fluid-tight modular joint illustrated in FIG. 1 in accordance with the present invention;

FIG. 4 is an enlarged, partial cross-sectional view of the first sealing assembly prior to full insertion of the fire sealing sleeve into the first housing;

FIG. 5 is an enlarged, partial cross-sectional view of the second sealing assembly prior to full insertion of the second sealing sleeve into the second housing;

FIG. 8 is a partial, side elevational view of an installation/extraction tool in accordance with the present invention for the installation and extraction of the first and second sealing sleeves into the first and second housings of the first and second sealing assemblies;

FIG. 9 is a partial, bottom plan view of the installation/extraction tool illustrated in FIG. 8 for installing the first and second sealing sleeves into the first and second housings of the first and second sealing assemblies;

FIG. 10 is an exploded, side elevational view in partial longitudinal section of the fluid-tight modular joint of the present invention, with the tubular sealing member removed from the first sealing assembly;

DETAILED DESCRIPTION OF THE PREFERRED EMBODIMENTS

Figure 1:
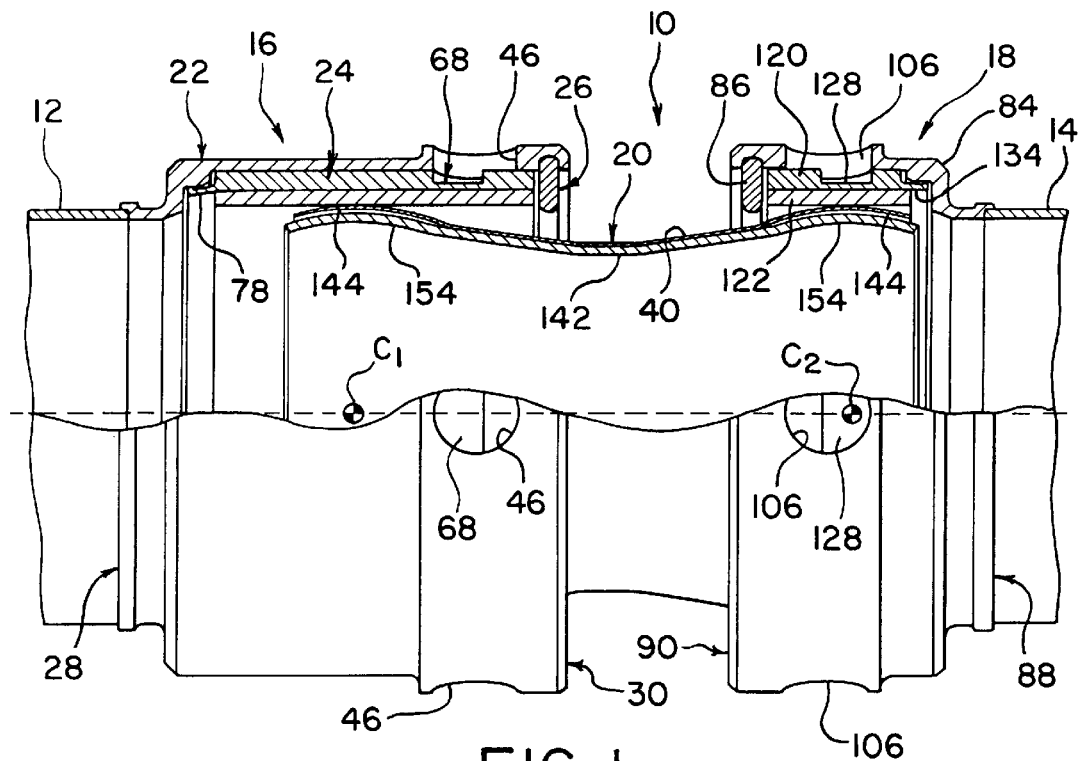
FIG. 1 is a side elevational view in partial longitudinal cross section of a fluid-tight modular joint in accordance with the present invention connected between a pair of conduits or tubes.

Referring initially to FIG. 1, a fluid-tight modular joint 10 in accordance with the present invention seals and interconnects first and second conduits or pipes 12 and 14 together to allow a high-temperature and highpressure fluid to flow therethrough. Modular joint 10 is designed to permit angular misalignment, axial movement and rotational movement of conduits 12 and 14. These movements of modular joint 10, especially in high vibration environments, cause various parts of joint 10 to wear out, and thus, the modular joint 10 begins to leak. Accordingly, modular joint 10 has replaceable parts, as explained below, to refurbish joint 10 when it begins to leak.

Fluid-tight modular joint 10 includes a first sealing assembly 16 rigidly coupled to first conduit 12, a second sealing assembly 18 rigidly coupled to second conduit 14, and a tubular sealing member 20 movably and fluidly interconnecting first sealing assembly 16 to second sealing assembly 18 to allow for angular and rotational flexibility between first and second conduits 12 and 14, as well as limited axial movement therebetween.

More specifically, first sealing assembly 16 is rigidly and fixedly coupled to first conduit 12, while second sealing assembly 18 is fixedly and rigidly coupled to second conduit 14. However, first and second conduits 12 and 14 are movably coupled together via joint 10, due to the interconnection between tubular sealing member 20 and sealing assemblies 16 and 18. In particular, tubular sealing member 20 allows for angular and rotational movement between first and second sealing assemblies 16 and 18 about center points $C_1$ and $C_2$, as well as axial movement with first sealing assembly 16 as explained below in more detail. Accordingly, modular joint 10 allows for flexibility in that it permits angular misalignment, axial movement and rotation of the conduits in high temperature and high vibration environments. However, as mentioned above, due to the expansion and contraction of the conduits and/or joint, as well as the vibration occurring therein, the sealing portions tend to sustain excess wear, and thus, the joint tends to leak after a period of time. Accordingly, modular joint 10 of the present invention is designed such that all of the seals can be readily removed and replaced, while other parts remain attached to conduits 12 and 14 for reuse.

First sealing assembly 16 includes a first tubular housing 22, a first replaceable sealing sleeve 24 and a first retaining ring 26. Housing 22 has a first open end 28 rigidly coupled to first conduit 12 via a weld, a second open end 30 for receiving a part of tubular sealing member 20 therein via an interference fit, and a tubular inner surface 32 extending between first open end 28 and second open end 30. Tubular inner surface 32 is concentrically arranged about the longitudinal axis of joint 10 when the joint is in perfect alignment. Housing 22 is preferably a machined member constructed of a hard, rigid, metallic material such as stainless steel or an Inconel alloy.

Figure 2:
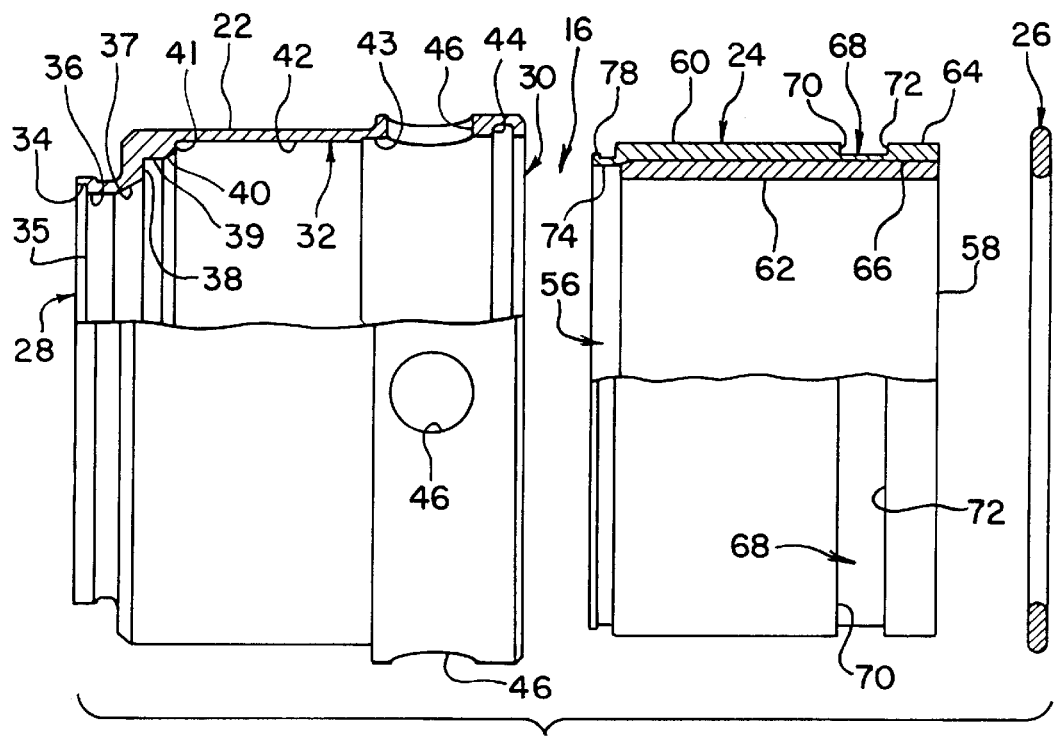
FIG. 2 is an exploded, side elevational view in partial longitudinal cross section of the first sealing assembly of the fluid-tight modular joint illustrated in FIG. 1 in accordance with the present invention.

As seen in FIG. 2, tubular inner surface 32 is contoured, and includes a cylindrical surface 34 for receiving the end of conduit 12 therein, an axially facing shoulder 35 for limiting movement of the end of conduit 12, a cylindrical surface 36, a frustoconical surface 37, an axially facing shoulder 38, a cylindrical sealing surface 39, a frustoconical surface or chamfer 40, an axially facing abutment surface 41, a cylindrical surface 42 for engaging first sealing sleeve 24, and a cylindrical clearance surface 43 with an annular groove 44 formed therein.

Figure 6:
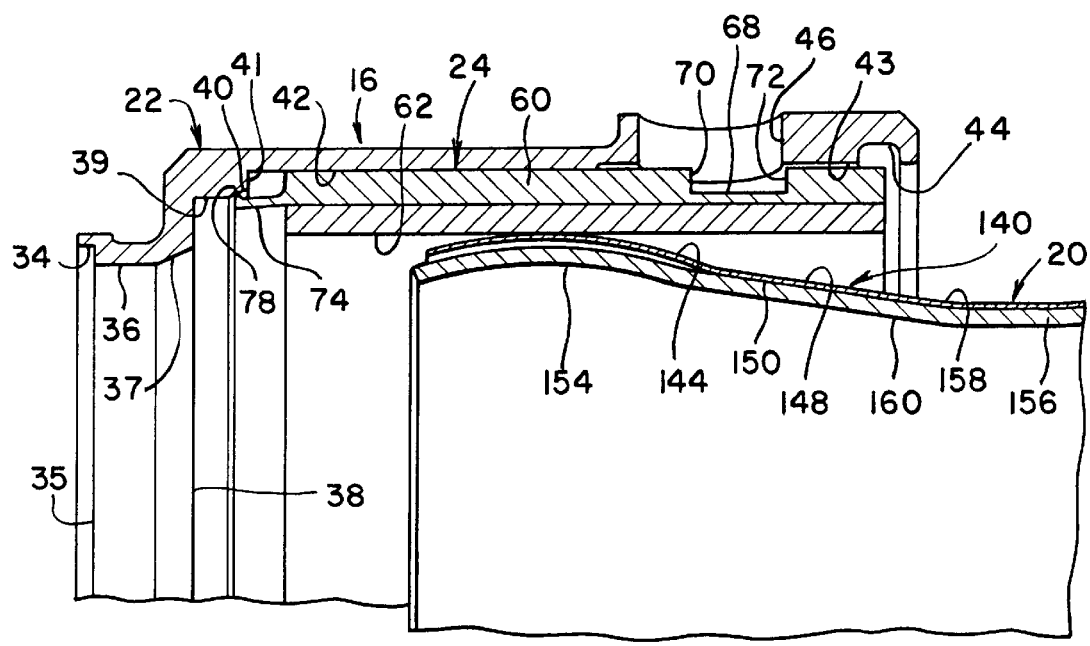
FIG. 6 is an enlarged, partial longitudinal cross-sectional view of the first sealing assembly prior to full insertion of the first sealing sleeve into the first housing and a partial longitudinal cross-sectional view of the tubular sealing member.
Figure 7:
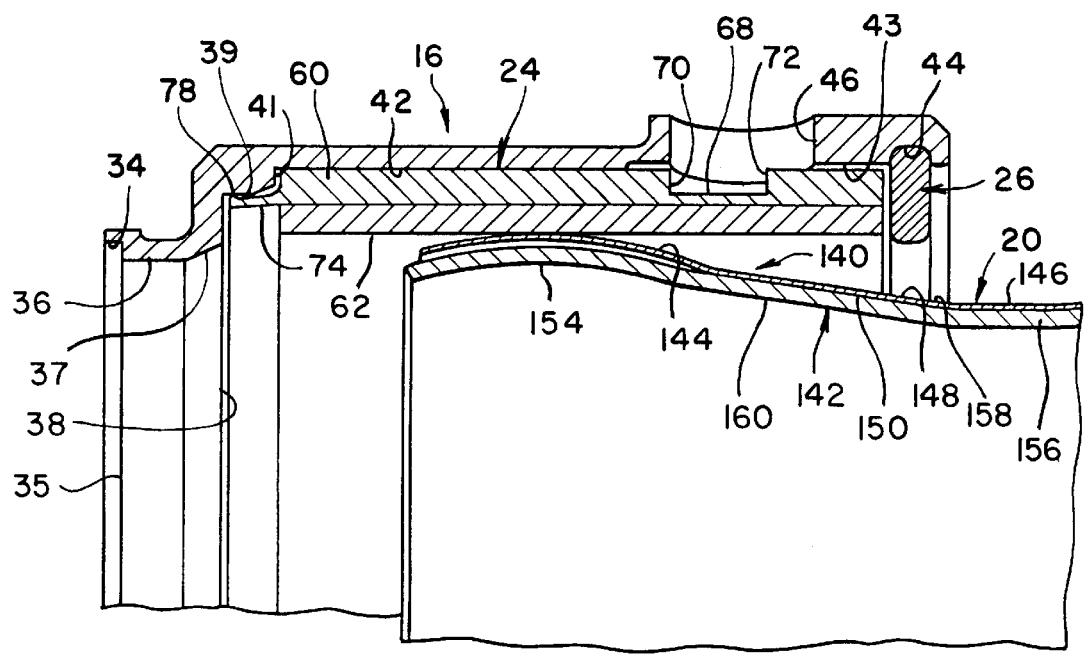
FIG. 7 is an enlarged, partial longitudinal cross-sectional view of the first sealing assembly and the tubular sealing member similar to FIG. 6, except that the sealing sleeve has been completely inserted into the first housing.
Figure 11:
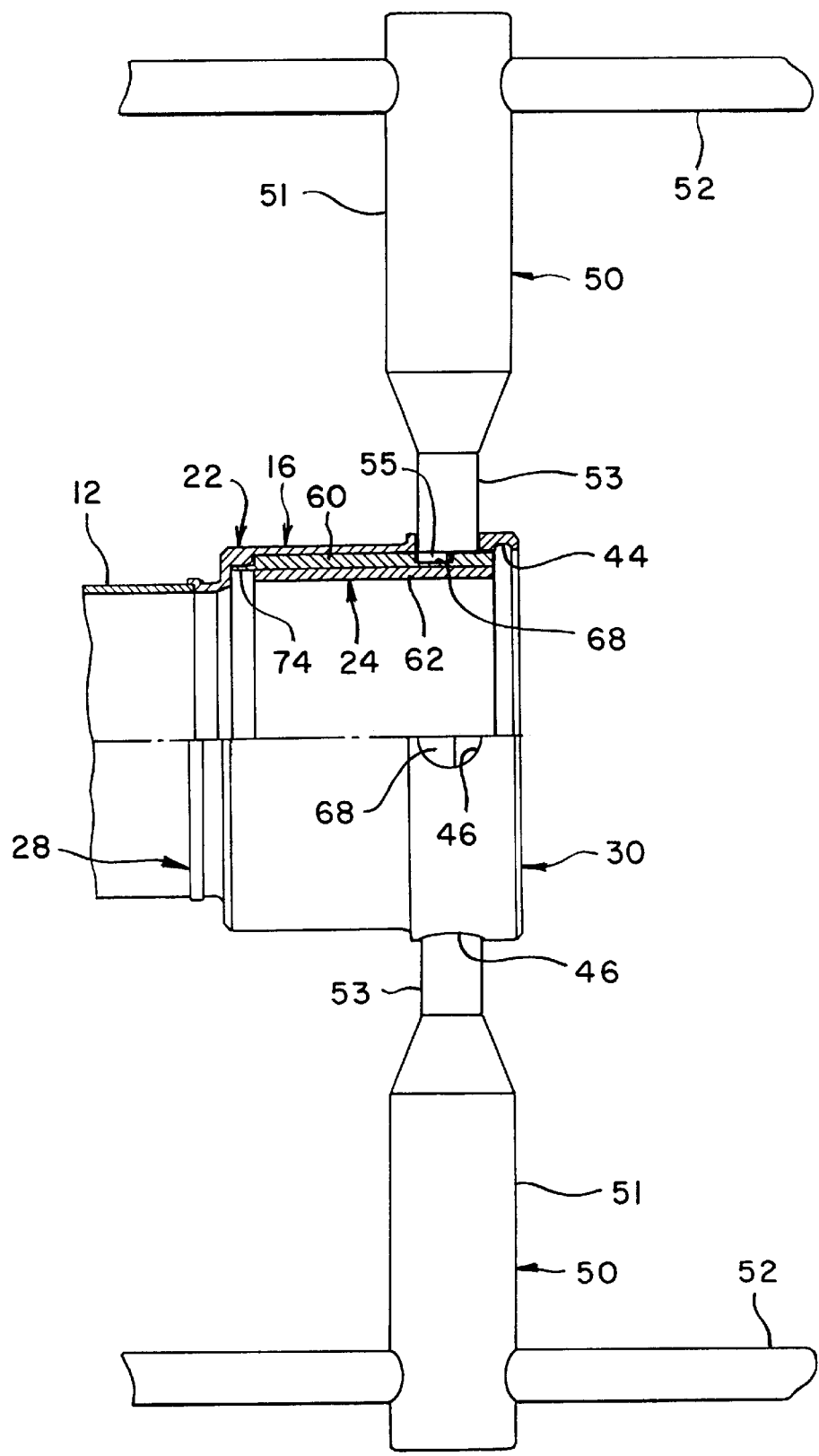
FIG. 11 is a side elevational view in partial longitudinal cross section of the first sealing assembly, with a pair of installation/extraction tools engaging the first sealing sleeve to begin removal of the sealing sleeve from he first housing of the first sealing assembly.

As best seen in FIGS. 6 and 7, tubular housing 22 is designed to removably receive replaceable sealing sleeve 24 therein. When sealing sleeve 24 is initially inserted into tubular housing 22, the outer surface of sealing sleeve 24 slidably engages cylindrical surface 42, but is spaced from cylindrical clearance surface 43. In other words, the outer diameter of sealing sleeve 24 is slightly smaller than the diameter of cylindrical surface 42. Cylindrical clearance surface 43, on the other hand, has a diameter which is sufficiently larger than the outer diameter of sealing sleeve 24 to accommodate imperfections in the outer surface of sealing sleeve 24 which may occur during installation and/or extraction of sealing sleeve 24.

Chamfer 40 is sloped or inclined radially inwardly from abutment surface 41 to cylindrical sealing surface 39. Accordingly, when sealing sleeve 24 is inserted into tubular housing 22, a portion of sealing sleeve 24 engages chamfer 40 so as to bias a portion of sealing sleeve 24 inwardly towards the longitudinal axis of joint 10. Upon complete insertion of sealing sleeve 24 into tubular housing 22, a portion of sealing sleeve 24 engages cylindrical sealing surface 39 to form a seal therebetween. Due to the inward deflection of a portion of sealing sleeve 24 by chamfer 40, sealing sleeve 24 applies a radially outwardly extending force on cylindrical sealing surface 39 to securely retain sealing sleeve 24 within housing 22 for preventing relative movement therebetween.

Sealing sleeve 24 is installed and extracted via four tool access openings 46 formed in housing 22. Access openings 46 are spaced 90° apart. Access openings 46 are preferably circular bores which extend through housing 22 at cylindrical clearance surface 43, and are designed to receive installation/extraction tool 50 illustrated in FIGS. 8 and 9. Accordingly, if tool 50 causes a burr on sealing sleeve 24 during installation and/or extraction of sealing sleeve 24 within housing 22, clearance surface 43 should provide sufficient space therebetween.

Installation/extraction tool 50 has a shaft 51 with a cross bar or handle 52 coupled to one end, and a cylindrical portion 53 formed at its second end for being received within one of the access openings 46. Shaft 51 has a longitudinal axis which extends substantially perpendicular to cross bar 52.

Cross bar 52 is preferably a circular bar which is received in a transverse bore 54 and can have any desired length. Cross bar 52 can be either fixedly coupled within bore 54 or slidably coupled as desired. Accordingly, cross bar 52 acts as a wrench or a tool for rotating shaft 51 about its longitudinal axis. Of course, it will be apparent to those skilled in the art from this disclosure that the first end of shaft 51 can be formed to receive various other types of tools such as wrenches. In other words, the first end of shaft 51 could be substituted with either a non-circular recess for receiving a tool therein, or can have its exterior surface shaped in a non-circular manner for receiving a wrench thereon.

Cylindrical portion 53 of tool 50 has a cylindrical cam member 55 extending axially from the free end of cylindrical portion 53. Cam member 55 has a longitudinal axis which is parallel to the longitudinal axis of shaft 51. However, the longitudinal axis of cam member 55 is offset from the longitudinal axis of shaft 51. Accordingly, rotation of shaft portion 51 causes cam member 55 to rotate or orbit about the longitudinal axis of shaft 51. When tool 50 is inserted into one of the access openings 46 and rotated, cam member 55 is designed to engage sealing sleeve 24 to axially slide sealing sleeve 24 within housing 22 for either installation or extraction of sealing sleeve 24 as discussed below in more detail.

As seen in FIGS. 2, 6 and 7, sealing sleeve 24 is a substantially tubular or cylindrical member having a first open end 56 and a second open end 58 so that fluid can flow therethrough. Sealing sleeve 24 includes an outer tubular or cylindrical support member 60, and an inner tubular or cylindrical wear-resistant element 62 fixedly coupled within support member 60. Accordingly, sealing sleeve 24 is preferably a two-piece unit with support member 60 and wear-resistant element 62 fixedly and rigidly coupled together as an integral unit. Support member 60 is preferably constructed of a hard, rigid material such as nickel alloy 718, stainless steel or an alloy of nickel and chromium.

Wear-resistant element 62, on the other hand, is preferably constructed of a non-metallic material having a low coefficient of friction in high temperature applications. Preferably, wear-resistant element 62 is constructed of a carbon-graphite composite, which is a self-lubricating and non-galling material.

Wear-resistant element 62 is preferably rigidly coupled to support member 60 by heating support member 60 so that its inner cylindrical surface expands, and then inserting the wear-resistant element 62 therein such that upon cooling of support member 60, wear-resistant element 62 is rigidly and fixedly coupled within support member 60. Wear-resistant element 62 has a smooth cylindrical inner surface 63 for engaging tubular sealing member 20 to allow rotational movement, angular movement, and axial linear movement therebetween.

Support member 60 has an outer cylindrical or tubular surface 64 for engaging cylindrical surface 42 of tubular housing 22 as discussed above, and an inner cylindrical or tubular surface 66 for fixedly and rigidly engaging wear-resistant element 62 as discussed above. Outer surface 64 of support member 60 preferably has a continuous, annular groove 68 which extends 360° about the circumference of support member 60 for receiving cam members 55 of tools 50.

Groove 68 has a tool installation surface 70 facing in a first axial direction and a tool extraction surface 72 facing in a second axial direction. Preferably, surfaces 70 and 72 are parallel, annular surfaces which extend radially outwardly from the center axis of sealing sleeve 24. Surfaces 70 and 72 are designed to be engaged by the cam member 55 of tool 50 for installation and extraction of sealing sleeve 24 as discussed below in detail.

First open end 56 of sealing sleeve 24 has a tubular sealing flange 74 extending axially therefrom. Tubular sealing flange 74 is integrally formed with support member 60. Tubular flange 74 has a free end, with an annular sealing lip 78 extending radially outwardly therefrom.

Tubular sealing flange 74 is sufficiently thin so that it can be at least partially elastically deformed upon insertion of sealing sleeve 24 within housing 22. In particular, when sealing sleeve 24 is inserted into tubular housing 22, annular sealing lip 78 will first engage chamfer 40 of housing 22, which is sloped inwardly towards the longitudinal axis of joint 10 such that further insertion of sleeve 24 within housing 22 compresses tubular flange 74 as it slides inwardly along chamfer 40. After passing over chamfer 40, annular sealing lip 78 engages cylindrical sealing surface 39 to create a seal therebetween. Due to the inward compression or deflection of tubular flange 74 by chamfer 40, sealing lip 78 applies a radially extending outward holding force on cylindrical sealing surface 39 to securely retain sealing sleeve 24 within housing 22 for preventing relative movement therebetween.

Preferably, when sealing sleeve 24 is inserted in housing 22, the free end of sealing flange 74 does not engage shoulder 38 of housing 22 as seen in FIG. 7. This is important because if the free end of sealing flange 74 engages shoulder 38, tubular sealing flange 74 could be crushed in such a manner so as to form gaps between annular sealing lip 78 and cylindrical sealing surface 39. Thus, this could cause the modular joint 10 to leak. Also, preferably there is a gap between support member 60 and abutment surface 41 during insertion, so that annular sealing lip 78 moves sufficiently along cylindrical sealing surface 39 to insure that annular sealing lip 78 fully engages cylindrical sealing surface 39.

Sealing sleeve 24 is positively prevented from removal during use by retaining ring 26 which is received within annular groove 44 of housing 22. Specifically, retaining ring 26 is preferably a conventional split ring having an inner diameter size so that sealing sleeve 24 is retained with housing 22. Preferably, there is a small gap between retaining ring 26 and the second open end 58 of sealing sleeve 24. However, it is important that this gap is not larger than the axial length of cylindrical sealing surface 39 between the point of contact of annular sealing lip 78 on cylindrical sealing surface 39 and the intersection of chamfer 40 with cylindrical surface 39. In other words, in the event that sealing sleeve 24 shifts within housing 22, the second open end of sealing sleeve 24 will engage retaining ring 26 before annular sealing lip 78 disengages from sealing surface 39.

Second sealing assembly 18 includes a second tubular housing 82, a second replaceable sealing sleeve 84 and a second retaining ring 86. Second sealing assembly is substantially identical to first sealing assembly 18, except that it is somewhat shorter in axial length and the sealing sleeve 84 is designed so that tubular sealing member 20 does not slide therein as explained below.

Housing 82 has a first open end 88 rigidly coupled to first conduit 14 via a weld, a second open end 90 for receiving a part of tubular sealing member 20 therein via an interference fit, and a tubular inner surface 92 extending between first open end 88 and second open end 90. Tubular inner surface 92 is concentrically arranged about the longitudinal axis of joint 10 when the joint is in perfect alignment. Housing 82 is preferably a machined member constructed of a hard, rigid, metallic material such as stainless steel or a nickel alloy.

As seen in FIGS. 3 and 5, tubular inner surface 92 is contoured, and includes a cylindrical surface 94 for receiving the end of conduit 14 therein, an axially facing shoulder 95 for limiting movement of the end of conduit 14, a cylindrical surface 96, a frustoconical surface 97, an axially facing shoulder 98, a cylindrical sealing surface 99, a frustoconical surface or chamfer 100, an axially facing abutment surface 101, a cylindrical surface 102 for engaging second sealing sleeve 84, and a cylindrical clearance surface 103 with an annular groove 104 formed therein.

As best seen in FIGS. 1 and 5, tubular housing 82 is designed to receive replaceable sealing sleeve 84 therein. When sealing sleeve 84 is initially inserted into tubular housing 82, the outer surface of sealing sleeve 84 slidably engages cylindrical surface 102, but is spaced from cylindrical clearance surface 103. In other words, the outer diameter of sealing sleeve 84 is slightly smaller than the diameter of cylindrical surface 102. Cylindrical clearance surface 103, on the other hand, has a diameter which is sufficiently larger than the outer diameter of sealing sleeve 84 to accommodate imperfections in the outer surface of sealing sleeve 84 which may occur during installation and/or extraction of sealing sleeve 84.

Chamfer 100 is sloped or inclined radially inwardly from abutment surface 101 to cylindrical sealing surface 99. Accordingly, when sealing sleeve 84 is inserted into tubular housing 82, a portion of sealing sleeve 84 engages chamfer 100 so as to bias a portion of sealing sleeve 84 inwardly towards the longitudinal axis of joint 10. Upon complete insertion of sealing sleeve 84 into tubular housing 82, a portion of sealing sleeve 84 engages cylindrical sealing surface 99 to form a seal therebetween. Due to the inward deflection of a portion of sealing sleeve 84 by chamfer 100, sealing sleeve 84 applies a radially outwardly extending force on cylindrical sealing surface 99 to securely retain sealing sleeve 84 within housing 82 for preventing relative movement therebetween. Sealing sleeve 84 is installed and extracted via four tool access openings 106 formed in housing 82. Access openings 106 are spaced 90° apart. Access openings 106 are preferably circular bores which extend through housing 82 at cylindrical clearance surface 103, and are designed to receive installation/extraction tool 50 illustrated in FIGS. 8 and 9 in the same manner as discussed above with respect to first sealing assembly 16. Accordingly, if tools 50 cause a burr on the outer surface of sealing sleeve 84 during installation and/or extraction of sealing sleeve 84 within housing 82, clearance surface 103 should provide sufficient space therebetween to accommodate such a burr on sealing sleeve 84.

As seen in FIG. 3, sealing sleeve 84 is a substantially tubular or cylindrical member having a first open end 116 and a second open end 118 so that fluid can flow therethrough. Sealing sleeve 84 includes an outer tubular or cylindrical support member 120, and an inner tubular or cylindrical wear-resistant element 122 fixedly coupled within support member 120. Accordingly, sealing sleeve 84 is preferably a two-piece unit with support member 120 and wear-resistant element 122 fixedly and rigidly coupled together as an integral unit. Support member 120 is preferably constructed of a hard, rigid material such as nickel alloy, stainless steel or an alloy of nickel and chromium.

Wear-resistant element 122, on the other hand, is preferably constructed of a non-metallic material having a low coefficient of friction in high temperature applications. Preferably, wear-resistant element 122 is constructed of a carbon-graphite composite, which is a self-lubricating and non-galling material.

Wear-resistant element 122 is preferably rigidly coupled to support member 120 by heating support member 120 so that its inner cylindrical surface expands, and then inserting the wear-resistant element 122 therein such that upon cooling of support member 120, wear-resistant element 122 is rigidly and fixedly coupled within support member 120. Wear-resistant element 122 has an inner cylindrical surface 123 provided with an annular curved recess or pocket 125 for engaging one end of tubular sealing member 20 to allow rotational movement and angular movement therebetween, but prevent relative linear movement therebetween.

Support member 120 has an outer cylindrical or tubular surface 124 for engaging cylindrical surface 102 of tubular housing 82, and an inner cylindrical or tubular surface 126 for fixedly and rigidly engaging wear-resistant element 122 as discussed above. Outer surface 124 of support member 120 preferably has a continuous, annular groove 128 which extends 360° about the circumference of support member 120 for receiving cam members 55 of tools 50 therein.

Groove 128 has a tool installation surface 130 facing in a first axial direction and a tool extraction surface 132 facing in a second axial direction. Preferably, surfaces 130 and 132 are parallel, annular surfaces which extend radially outwardly from the center axis of sealing sleeve 84. Surfaces 130 and 132 are designed to be engaged by the cam member 55 of tool 50 for installation and extraction of sealing sleeve 84 as discussed below in detail.

First open end 116 of sealing sleeve 84 has a tubular sealing flange 134 extending axially therefrom. Tubular sealing flange 134 is integrally formed with support member 120. Tubular flange 134 has a free end, with an annular sealing lip 138 extending radially outwardly therefrom.

Tubular sealing flange 134 is sufficiently thin so that it can be at least partially elastically deformed upon insertion of sealing sleeve 84 within housing 82. In particular, when sealing sleeve 84 is inserted into tubular housing 82, annular sealing lip 138 will first engage chamfer 100 of housing 82, which is sloped inwardly towards the longitudinal axis of joint 10 such that further insertion of sleeve 84 within housing 82 compresses tubular flange 134 as it slides inwardly along chamfer 100. After passing over chamfer 100, annular sealing lip 138 engages cylindrical sealing surface 99 to create a seal therebetween. Due to the inward compression or deflection of tubular flange 134 by chamfer 100, sealing lip 138 applies a radially extending outward holding force on cylindrical sealing surface 99 to securely retain sealing sleeve 24 within housing 22 for preventing relative movement therebetween.

Preferably, when sealing sleeve 84 is inserted in housing 82, the free end of sealing flange 134 does not engage shoulder 98 of housing 82. This is important because if the free end of sealing flange 134 engages shoulder 98, tubular sealing flange 134 could be crushed in such a manner so as to form gaps between annular lip 138 and cylindrical sealing surface 99. Thus, this could cause the modular joint 10 to leak. Also, preferably there is a gap between support member 120 and abutment surface 101 during insertion, so that annular sealing lip 138 moves sufficiently along cylindrical sealing surface 99 to insure that annular sealing lip 138 fully engages cylindrical sealing surface 99.

Sealing sleeve 84 is positively prevented from removal during use by retaining ring 86 which is received within annular groove 104 of housing 82. Specifically, retaining ring 86 is preferably a conventional split ring having an inner diameter size so that sealing sleeve 84 is retained with housing 82. Preferably, there is a small gap between retaining ring 86 and the second open end 118 of sealing sleeve 84. However, it is important that this gap is not larger than the axial length of cylindrical sealing surface 99 between the point of contact of annular sealing lip 138 on cylindrical sealing surface 99 and the intersection of chamfer 100 with cylindrical surface 99. In other words, in the event that sealing sleeve 84 shifts within housing 82, the second open end of sealing sleeve 84 will engage retaining ring 86 before annular sealing lip 138 disengages from sealing surface 99.

Tubular sealing member 20 is preferably similar to the tubular sealing member disclosed in U.S. Pat. No. 4,553,775 to Halling, which is hereby incorporated herein by reference. Moreover, this type of tubular sealing member 20 is currently sold by EG&G Pressure Science under the trademark TUBESEAL. Accordingly, tubular sealing member 20 will not be discussed or illustrated in detail herein. Moreover, sealing assemblies 16 and 18 do not have to be used with tubular sealing member 20, but can be used with other types of annular sealing members. In particular, sealing assembly 16 can be utilized with the sealing member disclosed in U.S. Pat. No. 4,054,306 to Sadoff, Jr. et al, and thus eliminate tubular sealing member 20 and second sealing assembly 18.

Tubular sealing member 20 includes a metallic, annular resilient sealing tube 140 and a rigid annular supporting member 142. The sealing tube 140 is disclosed in U.S. Pat. No. 4,553,755 to Halling which is hereby incorporated herein by reference. This metallic resilient sealing tube 140 is elastically deformable and forms an interference fit with wear-resistant elements 62 and 122 in substantially the same manner as discussed in U.S. Pat. No. 4,553,755 to Halling. The sealing tube 140 can advantageously be formed of Inconel. Sealing tube 140 comprises a pair of spherical end portions 144 and a center tubular portion 146 extending therebetween. Sealing tube 140 has an outer surface 148 and an inner surface 150.

The supporting member 142 is similar in shape to sealing tube 140 and includes a pair of spherical portions 144 interconnected by a tubular portion 156 extending therebetween. Supporting member 142 has a outer surface 158 and an inner surface 160, with the outer surface 158 along tubular portion 156 being in contact with inner surface 150 of sealing tube 140. However, along the spherical portions 154 of supporting member 142, its outer surface 158 does not engage the inner surface 150 of spherical portions 144 of sealing tube 140. Accordingly, there is an annular gap formed between the spherical portions 144 of sealing tube 140 and the spherical portions 154 of supporting member 142 so that spherical portions 144 can be elastically deformed inwardly by sealing sleeves 24 and 84. Thus, supporting member 142 is located inside and is substantially concentric to annular sealing tube 140, but spaced inwardly therefrom at its ends to form the annular gap therebetween. Preferably, this gap is about 0.005" to about 0.006".

Tubular sealing member 20 is coupled to first and second sealing assemblies 16 and 18 such that spherical portions 144 of sealing tube 140 are respectively received in an interference fit with the inner surfaces 63 and 123 of wear-resistant elements 62 and 122, respectively. In other words, tubular sealing member 20 is received via an interference fit with the inner tubular surfaces 63 and 123 of wear-resistant elements 62 and 122 engaging spherical portions 144 of sealing tube 140 to couple and seal the unit together. Since the inner surface 63 of wear-resistant element 62 is substantially cylindrical, the spherical portion 144 of sealing tube 140 engaging it can slide axially therein as well as rotate and pivot within wear-resistant element 62. The other end of sealing tube 140 engages the inner surface 123 of wear-resistant element 122 so that it can pivot and rotate, but cannot slide axially due to the slight curved recess or pocket 125 formed therein.

REFURBISHING AN EXISTING MODULAR JOINT 10

Referring now to FIGS. 10–18, the refurbishing of a modular joint 10 will now be discussed referring to the figures. Initially, retaining ring 26 is removed from groove 44 of first housing 22 such that tubular sealing member 20 can be axially withdrawn from first housing 22 as seen in FIG. 10. Next, a pair of tools 50 are inserted into a pair of opposite access openings 46 of first housing 22 for removal of sealing sleeve 24.

Figure 12:
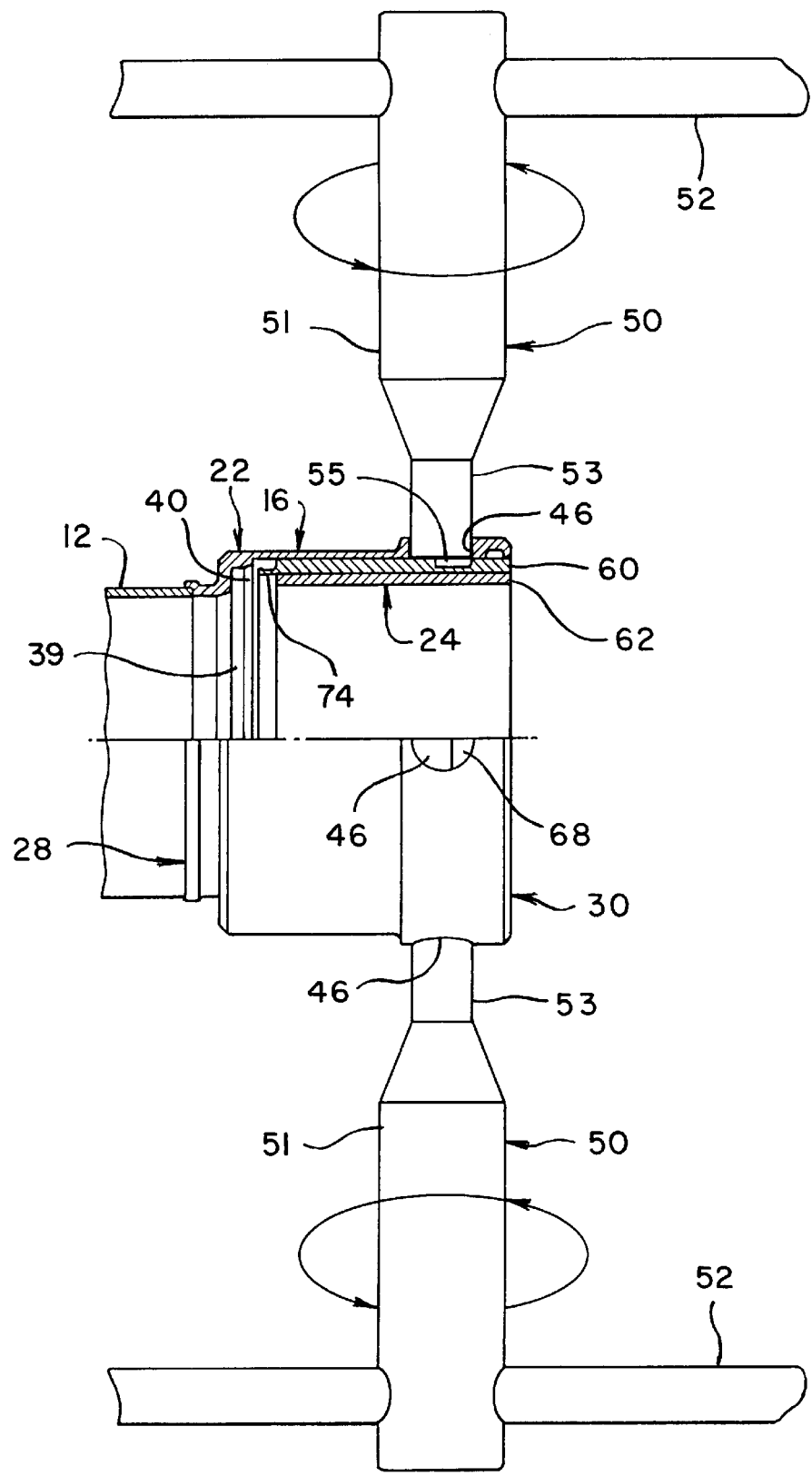
FIG. 12 is a side elevational view in partial longitudinal cross section of the first sealing assembly, with a pair of installation/extraction tools engaging the first sealing sleeve and rotated to remove the first sealing sleeve from the first housing of the first sealing assembly.
Figure 13:
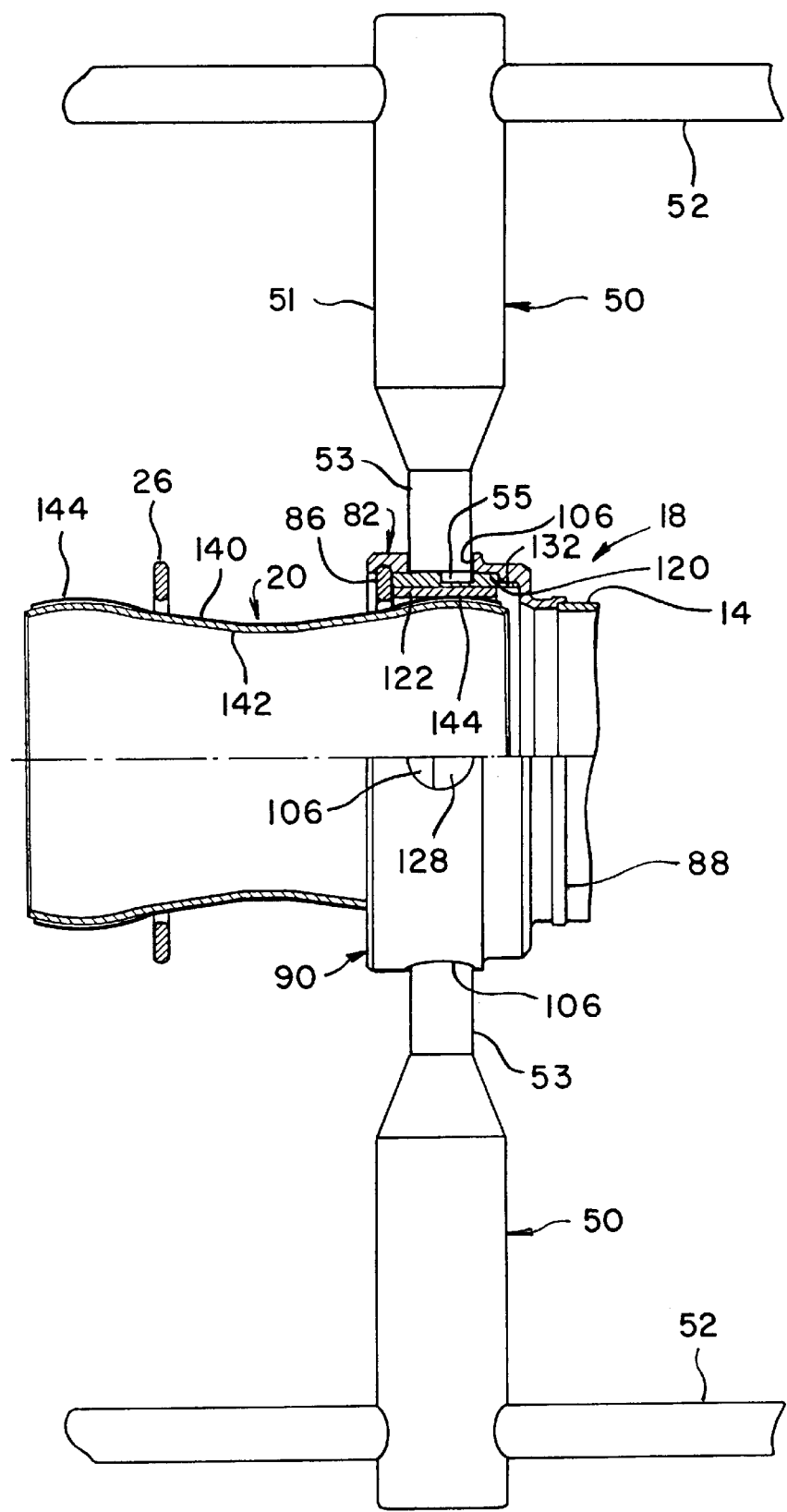
FIG. 13 is a side elevational view in partial longitudinal cross section of the tubular sealing member and the second sealing assembly, with a pair of installation/extraction tools engaging the second sealing sleeve to begin removal of the second sealing sleeve from the second housing of the first sealing assembly.
Figure 14:
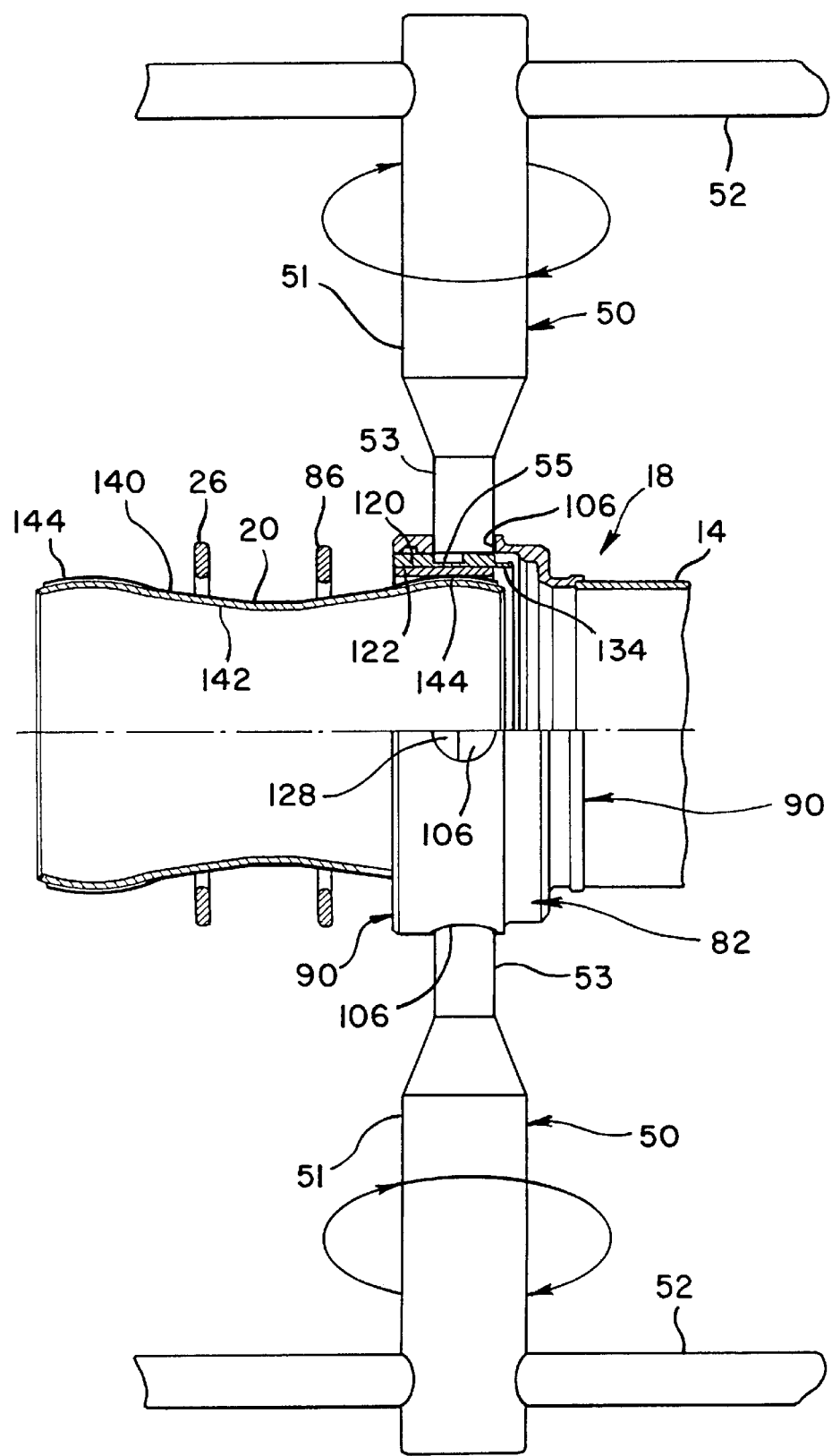
FIG. 14 is a side elevational view in partial longitudinal cross section of the tubular sealing member and the second sealing assembly, with the installation and extraction tools rotated for moving the second sealing sleeve from the second housing of the second sealing assembly.

In particular, the cylindrical portions 53 of tools 50 are inserted into a pair of access openings 46 of first housing 22 which are spaced 180° apart. This causes the cam members 55 of tool 50 to be received within groove 68 of support member 60. Rotation of the tools 50 causes the cam members 55 to engage tool extraction surface 72 of support member 60 such that rotation of tools 50 causes axial movement of sealing sleeve 24 within first housing 22 as seen in FIG. 12. This, of course, causes tubular sealing flange 74 with sealing lip 78 to move axially along cylindrical sealing surface 39 of first housing 22, and then begin to engage chamfer 40. When tubular sealing flange 74 begins to engage chamfer 40, the tubular flange 74 begins to spring out along chamfer 40 to force sealing sleeve 24 out of first housing 22. In other words, due to the elastic deformation of tubular flange 74 during installation, the force of the elastic deformation can be used to assist in removal of sealing sleeve 24.

The next step is to remove retaining ring 86 of second sealing assembly 18 to remove tubular sealing member 20 and sealing sleeve 84 from second housing 82. In particular, retaining ring 86 is removed from groove 104 of second housing 82 such that the sealing sleeve 84 and the end of the tubular sealing member 20 can be removed together as a unit. This is done again by inserting tools 50 into a pair of opposite access openings 106 of second housing 82 and then rotating tools 50 such that the cam members 55 engage the tool extraction surfaces 132 of the annular groove 128 of the support member 120 to axially slide sealing sleeve 84 outwardly within second housing 82. Similar to removal of first sealing sleeve 24, sealing lip 138 of tubular sealing flange 134 first rides along cylindrical sealing surface 99 of second housing 82 and the sealing lip 138 of tubular sealing flange 134 engages the chamfer 100 of housing 82 which aids in the extraction of sealing sleeve 84 due to the elastic deformation of sealing flange 134 during initial installation.

Figure 15:
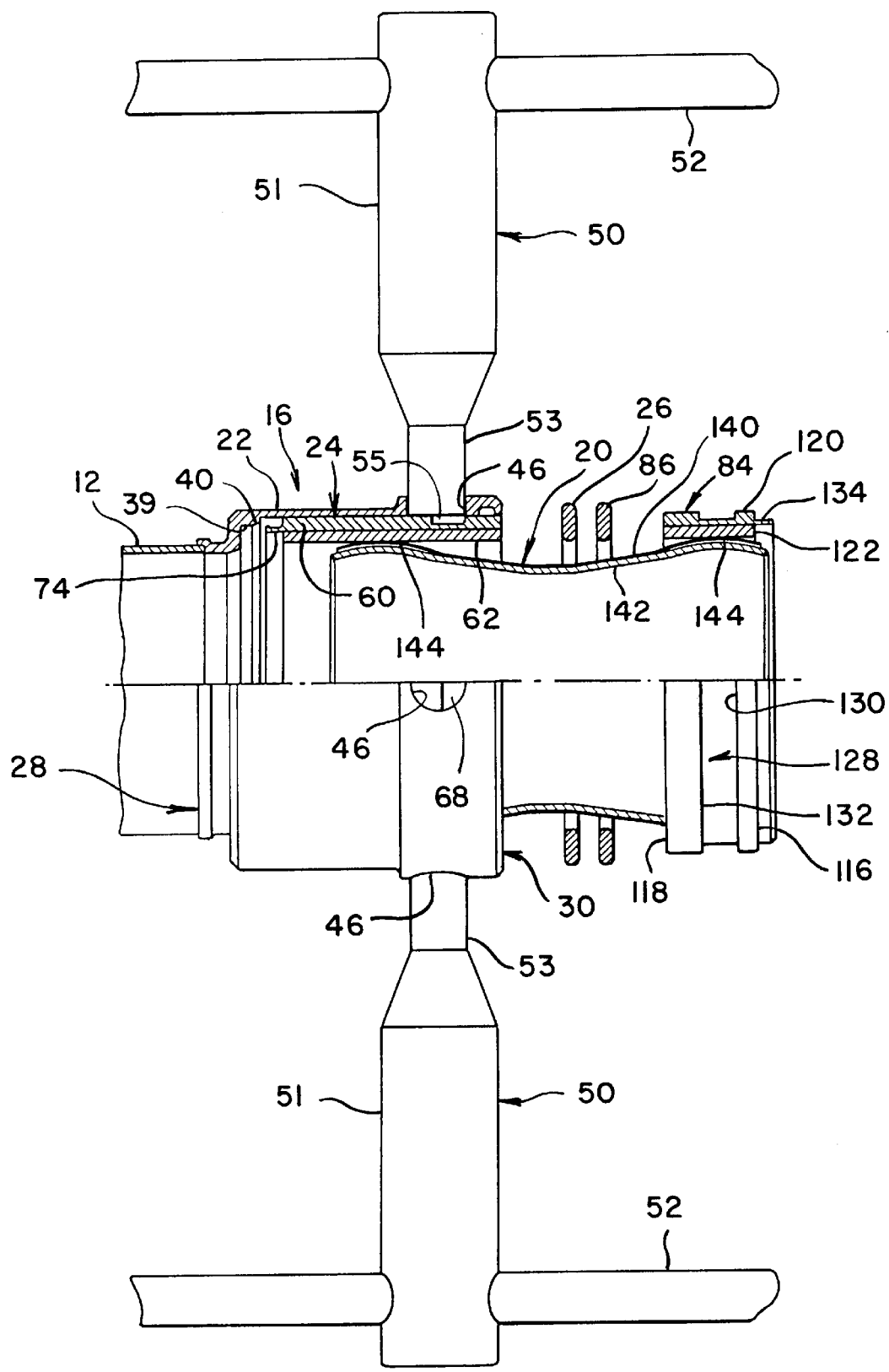
FIG. 15 is a side elevational view in partial longitudinal cross section of the first sealing assembly, with a rebuild kit assembly including a new tubular sealing member, a new pair of retaining rings, and a new second sealing sleeve being coupled to the first housing of the first sealing assembly utilizing a pair of installation/extraction tools.
Figure 16:
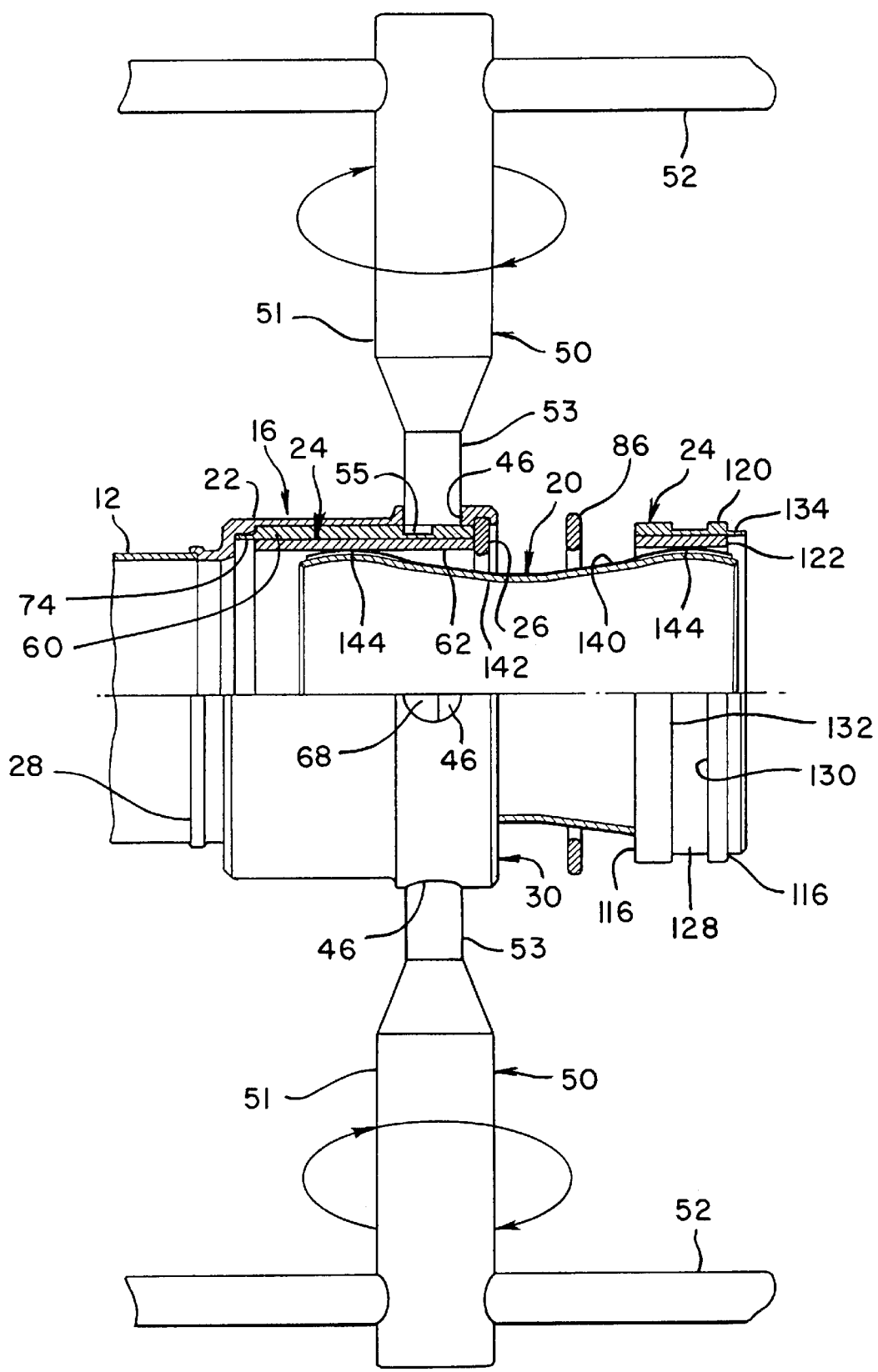
FIG. 16 is a side elevational view in partial longitudinal cross section of the first sealing assembly, with the new tubular sealing member and the new second sealing sleeve, similar to FIG. 15 except that the installation/extraction tool has been rotated to axially slide the first sealing sleeve within the first housing to secure it thereto and the first retaining ring has been coupled to the first housing.

Now, a rebuild kit assembly can be utilized to refurbish the modular joint 10. As seen in FIG. 15, the rebuild kit assembly would include a pair of new sealing sleeves 24 and 84, as well as a new tubular sealing member 20 and a pair of new retaining rings 26 and 86.

The first step is preferably to insert the new sealing sleeve 24 within first housing 22 such that the annular groove 68 of sealing sleeve 24 is aligned with the access openings 46 of first housing 22. Now, a pair of tools 50 are inserted into a pair of opposite access openings 46, which are spaced 1800 apart, such that cam members 55 of tools 50 engage the tool installation surfaces 70 of sealing sleeve 24. Preferably, in this position, the tool extraction surface 72 is not accessible through access openings 46. This is important so that one of the tools 50 cannot be turned the wrong way, causing one of the tools 50 to be applying an extracting force to the sealing sleeve 24, while the other tool 50 would be applying an installation force. Accordingly, with only the tool installation surface 70 being exposed to the tools 50 via access openings 46, only an installation force can be applied during initial rotation of the tools 50 to sealing sleeve 24.

Upon rotation of tools 50, the sealing lip 78 of sealing sleeve 24 initially engages chamfer 40 which causes tubular sealing flange 74 to be deflected radially inwardly such that tubular sealing flange 74 is at least partially elastically deformed. Further insertion of sealing sleeve 24 causes the annular sealing lip 78 to ride past chamfer 40 and then engage cylindrical sealing surface 38 to create a fluid-tight seal therebetween.

Next, retaining ring 26 is installed within groove 68 of first housing 22 to complete the assembly of first sealing assembly 26 to the tubular sealing member 20.

Figure 17:
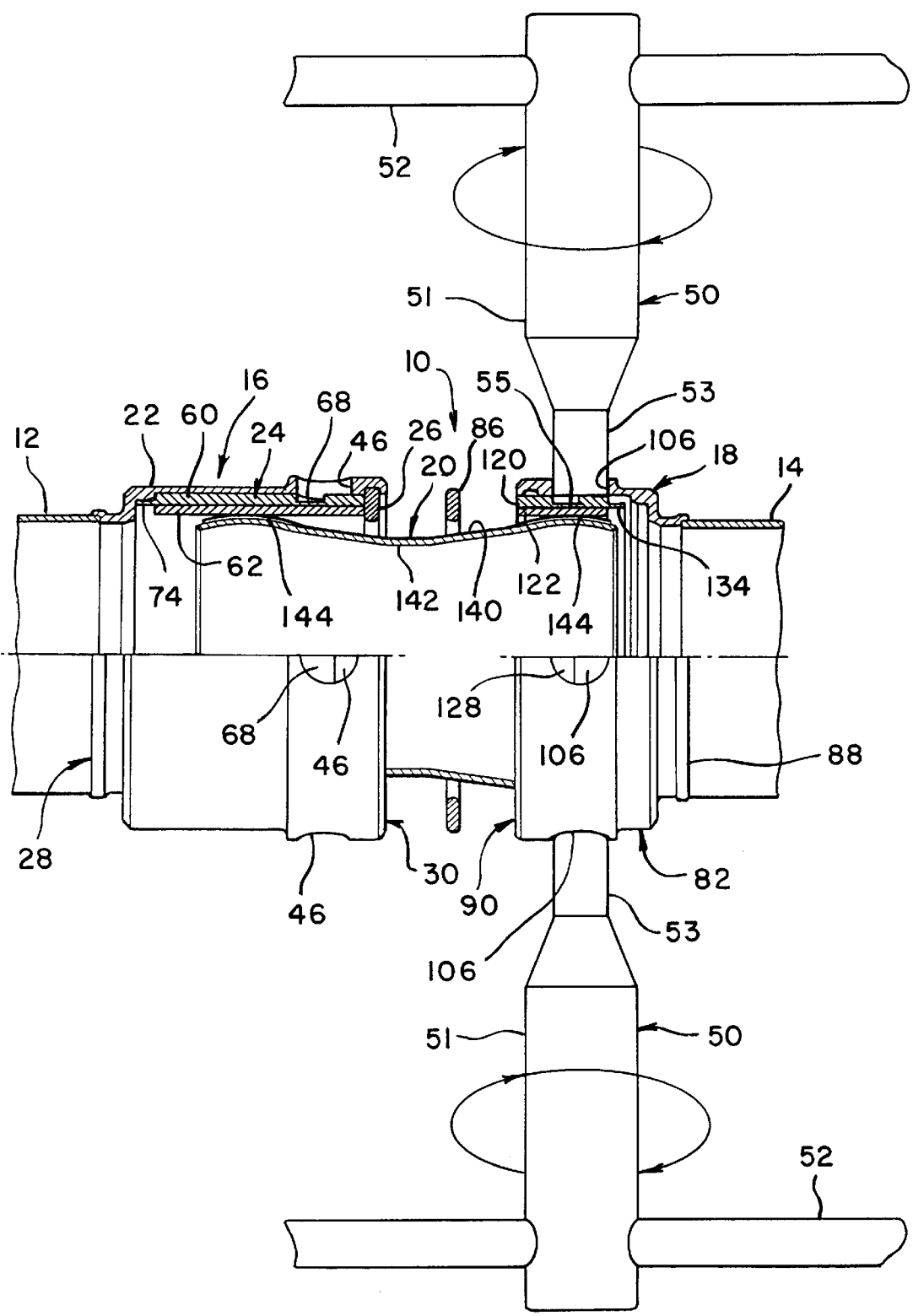
FIG. 17 is a partial, side elevational view in partial longitudinal cross section of the fluid-tight modular joint, with the second sealing assembly being coupled to the new second sealing sleeve via a pair of installation/extraction tools.
Figure 18:
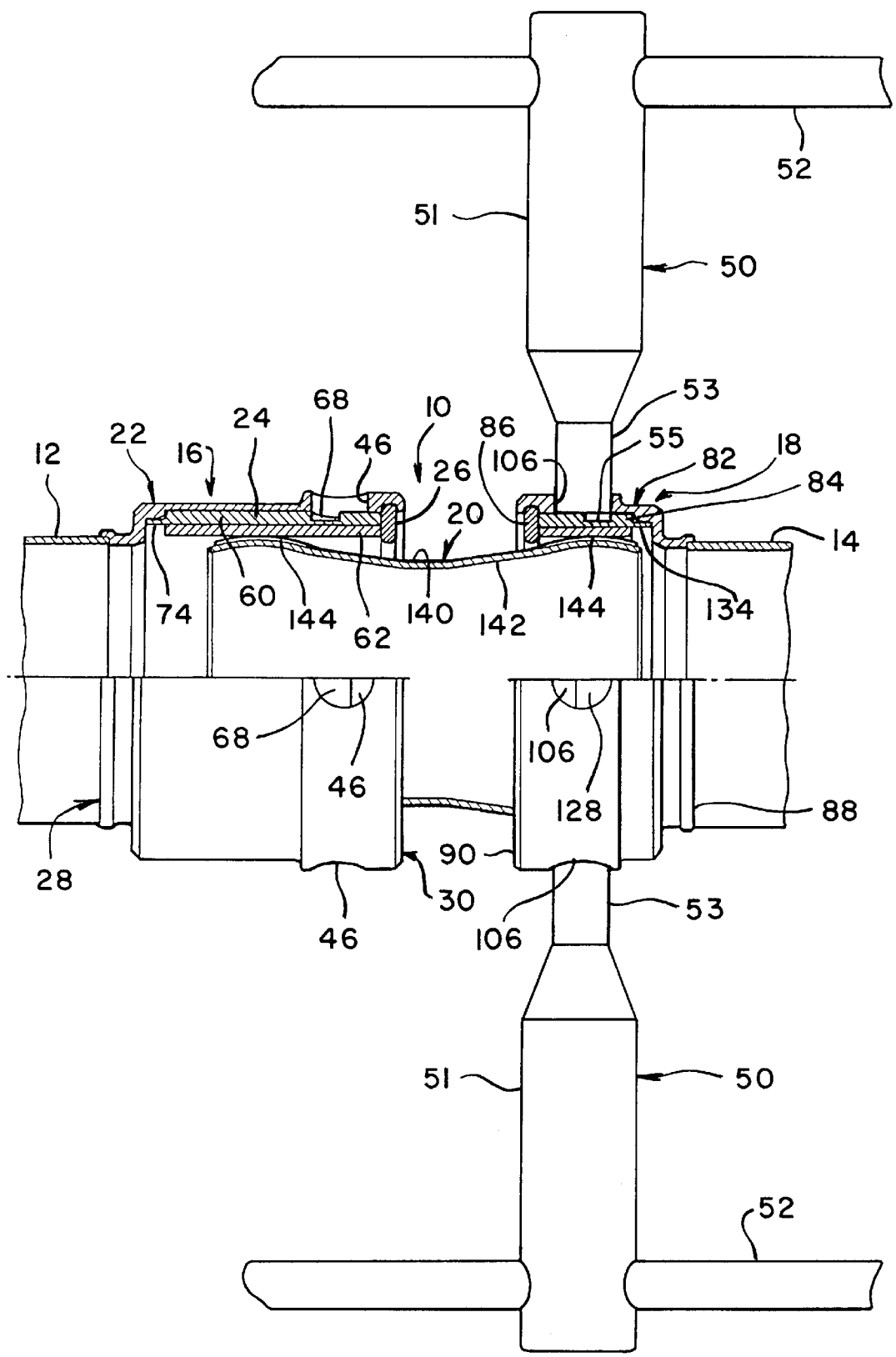
FIG. 18 is a side elevational view in partial longitudinal cross section of the fluid-tight modular joint similar to that shown in FIG. 17, except that the installation/extraction tools have been rotated to axially move the new second sealing sleeve within the second housing, and the second retaining ring has been installed to complete the assembly.

Now, as seen in FIG. 17, the new sealing sleeve 84 is installed within the existing tubular housing 82, together with the end of the tubular sealing member 20 coupled thereto. Again, this is done by utilizing a pair of tools 50 which are inserted through a pair of access openings 106 formed in second tubular housing 82 such that the cam members 55 of tools 50 engage the tool installation surface 130 of annular groove 128. Preferably, the tool extraction surface 132 of groove 128 is not exposed via the access openings 106 of housing 82, so that only an installation force can be applied to the sealing sleeve 84 during initial installation.

Rotation of the tools 50 causes the cam members 55 to push against tool installation surface 130 to axially move sealing sleeve 84 within second tubular housing 82. During initial axial movement of sealing sleeve 84, annular sealing lip 138 engages chamfer 100 of second housing 82 such that the tubular sealing flange 134 is deflected radially inwardly and at least partially elastically deform. Further insertion of sealing sleeve 84 causes annular sealing lip 138 to ride past chamfer 100 so as to engage cylindrical sealing surface 99 to create a fluid-tight seal therebetween. Finally, retaining ring 86 is installed within groove 128 of second housing 82 to complete the assembly of modular joint 10.

Figure 19:
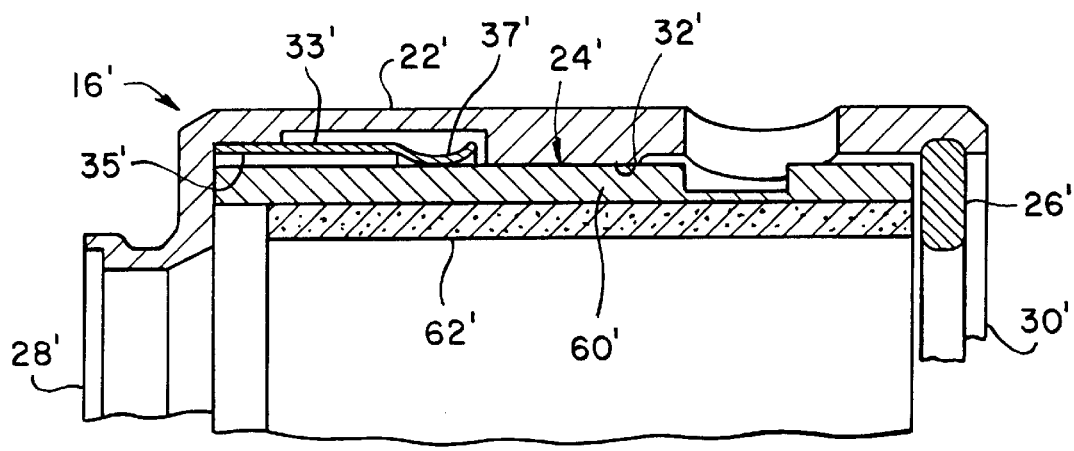
FIG. 19 is a partial, side elevational view in longitudinal cross section of an alternative first sealing assembly in accordance with the present invention.

Embodiment of FIG. 19

Referring now to FIG. 19, an alternative sealing assembly 16' in accordance with another embodiment of the present invention. Sealing assembly 16' is substantially identical to sealing assembly 16 discussed above, except that sealing assembly 16' has a different sealing arrangement between its tubular housing 22' and its sealing sleeve 24'. Accordingly, only the differences between sealing assembly 16' and sealing assembly 16 will be discussed herein.

Sealing assembly 16' includes a tubular housing 22', a replaceable sealing sleeve 24" and a retaining ring 26'. Housing 22' has a first open end 28' for rigidly coupling to a conduit via a weld, a second open end 30' for receiving a part of a tubular sealing member therein, a tubular inner surface 32' extending between first open end 28' and second open end 30', and an annular sealing element 33' fixedly secured to the inner tubular surface 32' of housing 22'.

Annular sealing element 33' is preferably constructed of a resilient metallic material and is coupled to the inner surface 32' of housing 22' via an interference fit. Specifically, annular sealing element 33' is rigidly coupled within housing 22' by heating housing 22' so that its cylindrical inner surface 32' expands outwardly, and then inserting annular sealing element 33' therein such that upon cooling of housing 22', annular sealing element 33' is rigidly and fixedly coupled within housing 22'.

Annular sealing element 33' is substantially identical to the annular sealing element of a similar structure disclosed in U.S. Pat. No. 4,071,268 to Halling et al, the disclosure of which is hereby incorporated herein by reference. As seen in FIG. 19', annular sealing element 33' has a ring-shaped portion 35' in an interference fit with the inner surface 32' of housing 22', and an annular curved surface 37' in engagement with the outer surface of sealing sleeve 24'. Annular sealing element 33' also acts to retain sealing sleeve 24' within housing 22' to prevent relative movement therebetween.

Sealing sleeve 24' is substantially identical to sealing sleeve 24 discussed above, except that the tubular sealing flange has been eliminated. Sealing sleeve 24' includes an outer tubular cylindrical support member 60' and an inner tubular or cylindrical wear-resistant element 62' fixedly coupled within support member 60'. Wear-resistant element 62' is substantially identical to wear-resistant element 62 discussed above, and thus, will not be further discussed herein.

Figure 20:
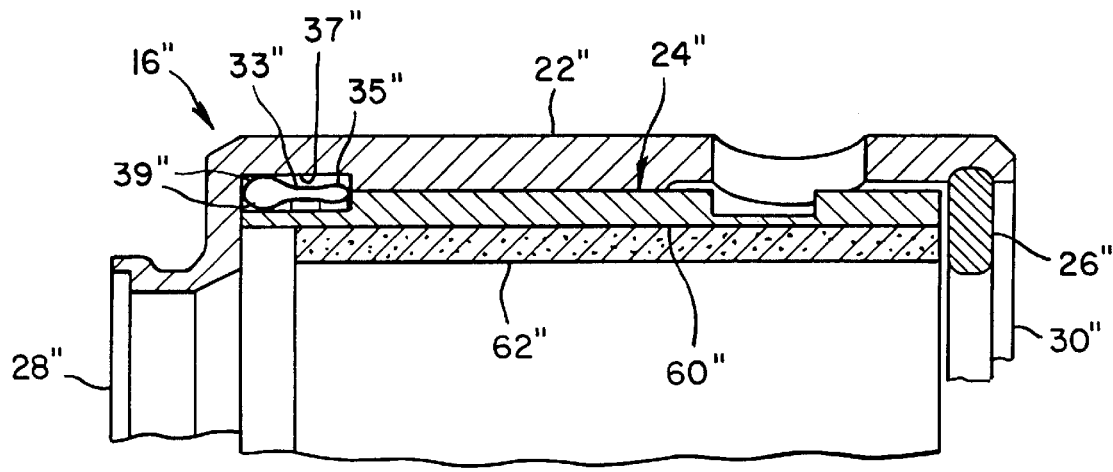
FIG. 20 is another partial, side elevational view in longitudinal cross section of another embodiment of a first sealing assembly in accordance with the present invention.

Embodiment of FIG. 20

Referring now to FIG. 20, an alternative sealing assembly 16" in accordance with another embodiment of the present invention. Sealing assembly 16" is substantially identical to sealing assembly 16 discussed above, except that sealing assembly 16" has a different sealing arrangement between its tubular housing 22' and its sealing sleeve 24". Accordingly, only the differences between sealing assembly 16" and sealing assembly 16 will be discussed and illustrated herein.

Sealing assembly 16" includes a tubular housing 22", a replaceable sealing sleeve 24" and a retaining ring 26". Housing 22" has a first open end 28" for rigidly coupling to a conduit via a weld, a second open end 30" for receiving a part of a tubular sealing member therein, and a tubular inner surface 32" extending between first open end 28" and second open end 30", and an annular sealing element 33" fixedly secured to the inner tubular surface 32".

Annular sealing element 33" is a pressure-energized seal constructed of a resilient metallic material. Sealing element 33" is coupled to the inner surface 32" of housing 22" via an interference fit. Specifically, annular sealing element 33" is rigidly coupled within housing 22" by heating housing 22" so that its cylindrical inner surface 32" expands outwardly, and then inserting annular sealing element 33" therein such that upon cooling of housing 22", annular sealing element 33" is rigidly and fixedly coupled within housing 22".

Annular sealing element 33" is substantially identical to the annular sealing element of a similar structure disclosed in U.S. Pat. No. 3,520,544 to Taylor, the disclosure of which is hereby incorporated herein by reference. As seen in FIG. 19", annular sealing element 33" has an annular bight portion 351" retained in annular recess 37" of inner surface 32" of housing 22", and a pair of annular curved legs 39" in engagement with the outer surface of sealing sleeve 24" and the inner surface of recess 37". Annular sealing element 33" also acts to retain sealing sleeve 24" within housing 22" to prevent relative movement therebetween.

Sealing sleeve 24" is substantially identical to sealing sleeve 24 discussed above, except that the tubular sealing flange has been eliminated. Sealing sleeve 24" includes an outer tubular cylindrical support member 60" and an inner tubular or cylindrical wear-resistant element 62" fixedly coupled within support member 60". Wear-resistant element 62" is substantially identical to wear-resistant element 62 discussed above, and thus, will not be further discussed herein.

Figure 21:
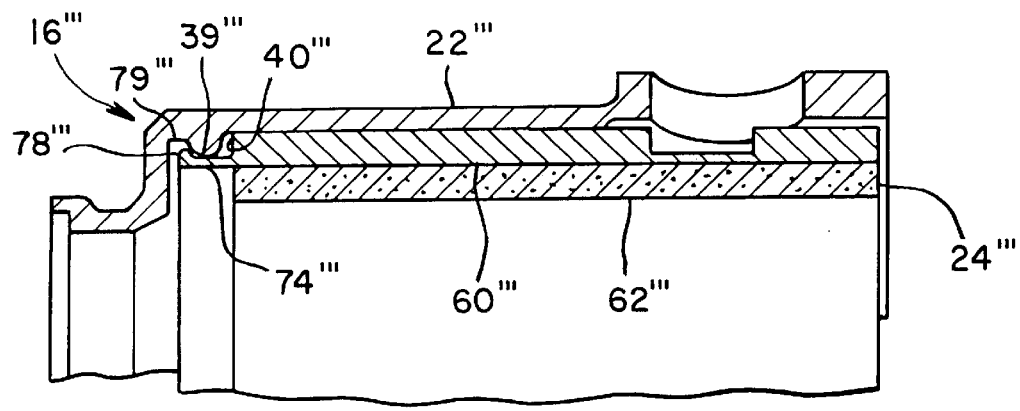
FIG. 21 is a partial, cross-sectional view in longitudinal cross section of another embodiment of the first sealing assembly in accordance with the present invention.

Embodiment of FIG. 21

Referring now to FIG. 21, an alternative sealing assembly 16''' in accordance with another embodiment of the present invention. Sealing assembly 16''' is substantially identical to sealing assembly 16 discussed above, except that the inner surface of tubular housing 22''' has been modified from that of the first embodiment. Accordingly, only the differences between sealing assembly 16''' and sealing assembly 16 will be discussed and illustrated herein.

Sealing assembly 16''' includes a first tubular housing 22''' and a replaceable sealing sleeve 24''' with a support member 60''' and a wear-resistant element 62'''. This embodiment differs from the first embodiment in that the inner surface 32''' of housing 22''' is provided with an annular groove designed to lock sealing sleeve 24''' within housing 22'''. Accordingly, this embodiment eliminates the need for a retaining ring.

More specifically, during axial insertion of sealing sleeve 24''' within housing 22''', the annular sealing flange 74''' is initially deflected inwardly by annular chamfer 40'''. This inward deflection of annular sealing flange 74''' is at least partially an elastomeric deformation such that further insertion of sealing sleeve 24''' within housing 22''' causes annular sealing lip 78''' to spring back into the annular groove 79''' of housing 22'''. Accordingly, sealing sleeve 24''' is retained via a snap fit within housing 22'''. In this embodiment, the housing 22''' is provided with a curved annular sealing surface 39''' which engages the outer surface of sealing flange 74'''.

While various advantageous embodiments have been chosen to illustrate the invention, it will be understood by those skilled in the art that various changes and modifications can be made herein without departing from the scope of the invention as defined in the appended claims.

What is claimed is:

1. A fluid-tight modular joint for conduits having a high-pressure fluid flowing therethrough, comprising:

a first tubular housing having a first open end for attachment to a first conduit, a second open end for movably receiving a first end of a tubular sealing member therein, and a tubular inner surface extending between said first and second open ends;

a first replaceable sealing sleeve removably secured within said tubular housing via a tool engaging an extraction portion formed thereon, said sealing sleeve having a first open end, a second open end, a tubular outer surface extending between said open ends of said sealing sleeve, and a tubular inner surface extending between said open ends of said sealing sleeve, said outer surface of said sealing sleeve being concentrically arranged and slidably received within said inner surface of said tubular housing to form an annular interface therebetween; and a first annular sealing element located at said annular interface and configured to seal and hold said sealing sleeve and said housing together.

2. A fluid-tight modular joint according to claim 1, wherein said housing includes an annular abutment surface located adjacent said first open end of said housing and an annular groove located adjacent said second open end of said housing with a retaining ring removably located therein, said sealing sleeve being positioned between said abutment surface and said retaining ring.

3. A fluid-tight modular joint according to claim 1, wherein said sealing sleeve includes a tubular support member, and a tubular wear-resistant element rigidly and fixedly received within said support member.

4. A fluid-tight modular joint according to claim 3, wherein said wear-resistant element is a self-lubricating and non-galling material.

5. A fluid-tight modular joint according to claim 4, wherein said wear-resistant element is constructed of a carbon-graphite material.

6. A fluid-tight modular joint according to claim 3, wherein said annular sealing element is integrally coupled to said support member of said sealing sleeve.

7. A fluid-tight modular joint according to claim 6, wherein said annular sealing element being formed by a tubular flange extending axially from said support member, said tubular flange engaging said inner surface of said housing to seal said interface and to secure said sealing sleeve within said housing.

8. A fluid-tight modular joint according to claim 7, wherein said tubular inner surface of said housing includes a cylindrical sealing surface with a first diameter, a cylindrical guide surface with a second diameter larger than said first diameter, and an annular chamfer surface extending between said sealing surface and said guide surface, said tubular flange of said annular sealing element having an outer diameter in its unstressed state being sized between said first and second diameters such that upon insertion of said sealing sleeve into said housing, said tubular flange initially engages said chamfer and then engages said tubular flange is deformed inwardly to engage said sealing surface.

9. A fluid-tight modular joint according to claim 8, wherein said tubular flange is constructed of a substantially rigid material which is at least partially elastically deformed when engaging said sealing surface of said housing.

10. A fluid-tight modular joint according to claim 9, wherein said extraction portion is a recess formed in said outer surface of said sealing sleeve.

11. A fluid-tight modular joint according to claim 10, wherein said housing has at least one opening extending therethrough for accessing said recess of said sealing sleeve.

12. A fluid-tight modular joint according to claim 11, wherein said housing has two of said openings in said housing, and said recess extends 360° and includes a tool insertion surface and a tool extraction surface, both of which extend substantially radially from said sealing sleeve.

13. A fluid-tight modular joint according to claim 12, wherein said tool extraction surface is located so that said tool extraction surface is inaccessible from said openings in said housing until said tubular flange engages said sealing surface of said housing.

14. A fluid-tight modular joint according to claim 1, wherein said extraction portion is a recess formed in said outer surface of said sealing sleeve.

15. A fluid-tight modular joint according to claim 14, wherein said housing has at least one opening extending therethrough for accessing said recess of said sealing sleeve.

16. A fluid-tight modular joint according to claim 15, wherein said housing has two of said openings in said housing, and said recess extends 360° and includes a tool insertion surface and a tool extraction surface, both of which extend substantially radially from said sealing sleeve.

17. A fluid-tight modular joint according to claim 8, wherein said tubular flange of said sealing element has a sealing lip and said tubular housing has an annular recess located adjacent said sealing surface of said housing to receive said sealing lip for forming a snapfit between said sealing sleeve and said housing.

18. A fluid-tight modular joint according to claim 1, wherein said annular sealing element is a separate element located between said outer surface of said sealing sleeve and said inner surface of said housing.

19. A fluid-tight modular joint according to claim 18, wherein
said annular sealing element is fixedly coupled to said inner surface of said housing.

20. A fluid-tight modular joint for conduits having a high-pressure fluid flowing therethrough comprising:
a tubular sealing member having a first open end with a first annular sealing surface and a second open end with a second annular sealing surface;
first and second tubular housings movably coupled to said first and second open ends of said tubular sealing member, respectively, each of said first and second housings including a first open end for attachment to a conduit, a second open end for movably receiving one of said ends of said tubular sealing member therein, and an inner tubular surface extending between said first and second open ends of said first and second housings, respectively;
first and second replaceable sealing sleeves removably secured within said first and second housings, respectively, via a tool engaging first and second extraction portions formed thereon, respectively, each of said first and second replaceable sealing sleeves including first and second open ends with tubular inner and outer surfaces extending therebetween, said outer surfaces of said first and second sealing sleeves engaging said inner surfaces of said first and second housings, respectively, said first and second inner surfaces movably engaging said first and second sealing surfaces of said tubular sealing member; and
first and second annular sealing elements located between said first and second housings and said first and second sealing sleeves, respectively, said sealing elements being yieldably deformed to frictionally maintain said sealing sleeves coupled within said housings and to create a seal therebetween.

21. A fluid-tight modular joint according to claim 20, wherein
each of said first and second housings includes an annular abutment surface located adjacent said first open end of each of said housings and an annular groove located adjacent said second open end of each of said housings with a retaining ring removably located therein, each of said sealing sleeves being positioned between said abutment surface and said retaining ring.

22. A fluid-tight modular joint according to claim 21, wherein
each of said sealing sleeves includes a tubular support member, and a tubular wear-resistant element rigidly and fixedly received within said support member.

23. A fluid-tight modular joint according to claim 22, wherein
each of said wear-resistant elements is a self-lubricating and non-galling material.

24. A fluid-tight modular joint according to claim 23, wherein
each of said wear-resistant elements is constructed of a carbon-graphite material.

25. A fluid-tight modular joint according to claim 22, wherein
each of said annular sealing elements is integrally coupled to its respective said support member.

26. A fluid-tight modular joint according to claim 22, wherein
each of said annular sealing elements being formed by a tubular flange extending axially from its respective said support member, each of said tubular flanges engaging its respective said inner surface of its respective said housing to seal and to secure its respective said sealing sleeve within its respective said housing.

27. A fluid-tight modular joint according to claim 26, wherein
said tubular inner surface of each of said housings includes a cylindrical sealing surface with a first diameter, a cylindrical guide surface with a second diameter larger than said first diameter, and an annular chamfer surface extending between its respective said sealing surface and its respective said guide surface,
each of said tubular flange of its respective said annular sealing element having an outer diameter in its unstressed state being sized between said first and second diameters such that upon insertion of each of said sealing sleeves into each of said housings, each of said tubular flanges initially engages its respective said chamfer and then engages its respective said tubular flange for being deformed inwardly to engage its respective said sealing surface.

28. A fluid-tight modular joint according to claim 20, wherein
each of said extraction portions is a recess formed in said outer surface of each of said sealing sleeves.

29. A fluid-tight modular joint according to claim 28, wherein
each of said housings has at least one opening extending therethrough for accessing its respective said recess of its respective said sealing sleeve.

30. A fluid-tight modular joint according to claim 29, wherein
each of said housings has two of said openings in its respective said housing, and each of said recesses extends 360$20$ and includes a tool insertion surface and a tool extraction surface, both of which extend substantially radially from its respective said sealing sleeve.

31. A fluid-tight modular joint according to claim 21, wherein
each of said annular sealing element is a separate element located between said outer surface of its respective said sealing sleeve and said inner surface of its respective said housing.

32. A fluid-tight modular joint according to claim 31, wherein
each of said annular sealing elements is fixedly coupled to said inner surface of its respective said housing.

33. A replaceable sealing sleeve adapted to be received within a fluid-tight modular joint, comprising:
a tubular support member having first and second open ends with a tubular outer surface and a tubular inner surface having a minimum inner diameter, said tubular outer surface and said tubular inner surface extending the entire distance between said first and second open ends;
a tubular wear-resistant element rigidly coupled to said support member to overlie said inner surface of said support member, said tubular wear-resistant element having a tubular inner surface with a low coefficient of friction at elevated temperatures and with a minimum inner diameter that is less than said minimum inner diameter of said tubular inner surface of said tubular support member; and
an annular sealing member integrally formed as a non-separable part of said sealing sleeve and arranged to create a fluid-tight seal with a tubular member of the modular joint.

34. A replaceable sealing sleeve according to claim 33, wherein said wear-resistant element is a self-lubricating and non-galling material.

35. A replaceable sealing sleeve according to claim 34, wherein said wear-resistant element is constructed of a carbon-graphite material.

36. A replaceable sealing sleeve for a fluid-tight modular joint, comprising:

a tubular support member having first and second open ends with a tubular outer surface and a tubular inner surface; and a tubular wear-resistant element rigidly coupled to said support member to overlie said inner surface of said support member, said tubular wear-resistant element having a tubular inner surface with a low coefficient of friction at elevated temperatures, said wear-resistant element being constructed of a self-lubricating and non-galling carbon-graphite material, and said tubular support member having a tubular sealing flange extending from said first end of said support member, said sealing flange being cantilevered from and thinner than said support member to permit elastic, radial deformation of said sealing flange relative to said support member.

37. A replaceable sealing sleeve adapted to be received within a fluid-tight modular joint, comprising:

a tubular support member having a center axis and first and second open ends with a tubular outer surface and a tubular inner surface, said tubular outer surface having a groove with a first surface facing in a first axial direction and a second surface facing in a second axial direction, each of said first and second surfaces extending radially outwardly from said center axis in a direction that is substantially perpendicular to said center axis;

a tubular wear-resistant element rigidly coupled to said support member to overlie said inner surface of said support member, said tubular wear-resistant element having a tubular inner surface with a low coefficient of friction at elevated temperatures; and an annular sealing member integrally formed as a non-separable part of said sealing sleeve and arranged to create a fluid-tight seal with a tubular member of the modular joint.

* * * * *